United States Patent [19]

Takeda

[11] Patent Number: 5,199,083
[45] Date of Patent: Mar. 30, 1993

[54] IMAGE DATA PROCESSING METHOD AND SYSTEM FOR GIVING IDENTIFICATION LABELS TO AREAS OF CONNECTED BLACK PICTURE ELEMENTS

[75] Inventor: Haruo Takeda, Palo Alto, Calif.

[73] Assignee: Hitachi, Ltd., Tokyo, Japan

[21] Appl. No.: 736,050

[22] Filed: Jul. 25, 1991

[30] Foreign Application Priority Data

Jul. 30, 1990 [JP] Japan ................... 2-199293

[51] Int. Cl.$^5$ ............................................. G06K 9/36
[52] U.S. Cl. .......................................... 382/26; 382/9; 382/48
[58] Field of Search ................... 382/26, 9, 48, 56; 377/10, 11

[56] References Cited

U.S. PATENT DOCUMENTS

| 4,624,013 | 11/1986 | Urushibata | 382/26 |
| 4,791,676 | 12/1988 | Flickner et al. | 382/26 |
| 4,821,336 | 4/1989 | Roye | 382/56 |
| 4,887,302 | 12/1989 | Urushibata | 382/26 |
| 4,991,224 | 2/1991 | Takahashi et al. | 382/26 |
| 5,018,214 | 5/1991 | Pasch | 382/9 |

FOREIGN PATENT DOCUMENTS 61-243569 10/1986 Japan .
63-20578 1/1988 Japan .
63-59680 3/1988 Japan .

Primary Examiner—David K. Moore
Assistant Examiner—David Fox
Attorney, Agent, or Firm—Fay, Sharpe, Beall, Fagan, Minnich & McKee

[57] ABSTRACT

Image data processing method and system for giving area identification labels to individual areas of connected black (or white) elements included in image data are disclosed. Image data compressed by modified READ coding is successively analyzed in units of code word. Each time the image data is analyzed in units of one code word, a run table for storing a relationship between run data indicative of the position of each run and the value of a provisional label given to that run and a label table for storing a relationship between provisional labels to be later unified so as to have the same value are updated, without a wait for the expansion of the whole of the image to bit data, on the basis of a predetermined processing rule defined corresponding to the kind of a code word analyzed. When the processing has been completed for all of code words, the value of a provisional label for each run stored in the run table is corrected on the basis of the contents of the label table.

14 Claims, 20 Drawing Sheets

FIG. IA
PRIOR ART
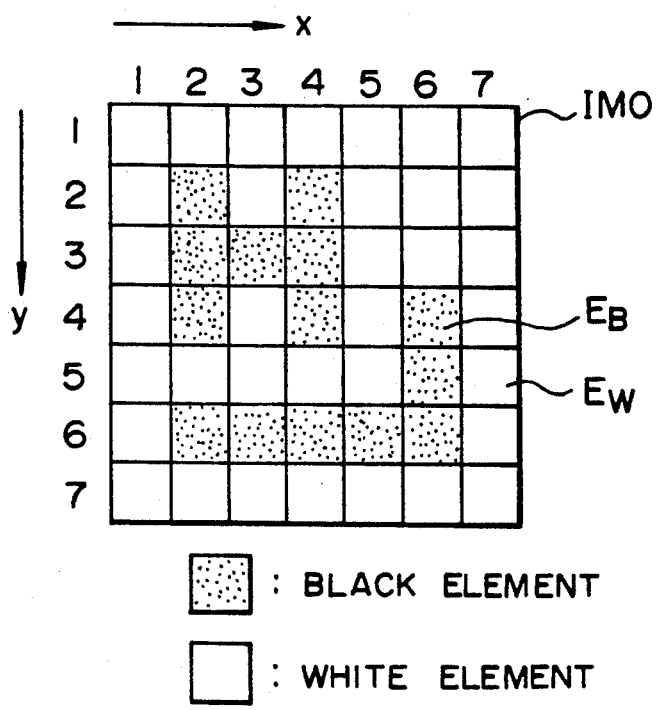
FIG. IB
PRIOR ART
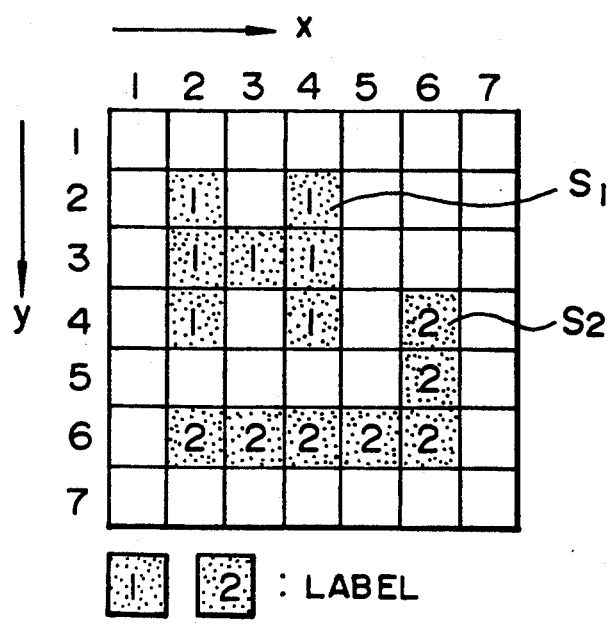

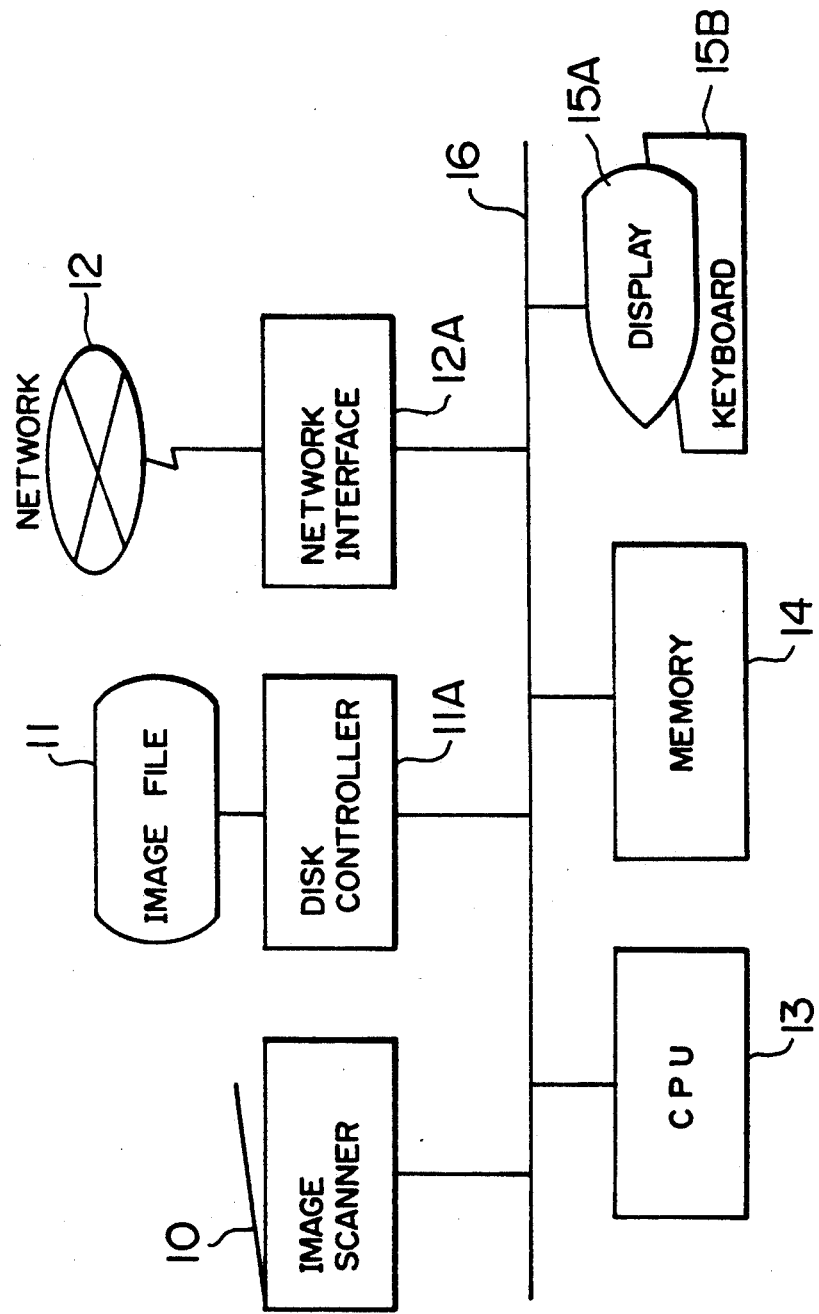

| | CONDITION | MODE | CODE | VALUE OF NEXT $a_0$ |
|---|---|---|---|---|
| 1 | $b_2 < a_1$ | PASS | P | $b_2$ |
| 2 | $a_1 = b_1$ | VERTICAL | $V(0)$ | $a_1$ |
| 3 | $0 < a_1 - b_1 \leq 3$ | VERTICAL | $V_L(b_1 - a_1)$ | $a_1$ |
| 4 | $0 < b_1 - a_1 \leq 3$ | VERTICAL | $V_R(a_1 - b_1)$ | $a_1$ |
| 5 | OTHER CASE | HORIZONTAL | $H(a_1 - a_0, a_2 - a_1)$* | $a_2$ |

\* IF $a_0 = 0$ THEN $a_1 - a_0 := a_1 - a_0 - 1$

FIG. 5

| t | code | y |
|---|---|---|
| 1 | V(0) | 1 |
| 2 | H(1,1) | 2 |
| 3 | H(1,1) | |
| 4 | V(0) | |
| 5 | V(0) | 3 |
| 6 | P | |
| 7 | V(0) | |
| 8 | V(0) | |
| 9 | V(0) | 4 |
| 10 | V$_L$(2) | |
| 11 | H(1,1) | |
| 12 | V$_L$(2) | |
| 13 | V$_L$(1) | |
| 14 | V(0) | |
| 15 | P | 5 |
| 16 | P | |
| 17 | V(0) | |
| 18 | V(0) | |
| 19 | V(0) | |
| 20 | H(1,5) | 6 |
| 21 | V(0) | |
| 22 | P | 7 |
| 23 | V(0) | |

| r' | x1 | x2 | y | LA |
|---|---|---|---|---|
| 1 | 8 | 8 | 1 | 0 |
| 2 | 2 | 3 | 2 | 1 |
| 3 | 4 | 5 | 2 | 2 |
| 4 | 8 | 8 | 2 | 0 |
| 5 | 2 | 5 | 3 | 1 |
| 6 | 8 | 8 | 3 | 0 |
| 7 | 2 | 3 | 4 | 1 |
| 8 | 4 | 5 | 4 | 1 |
| 9 | 6 | 7 | 4 | 3 |
| 10 | 8 | 8 | 4 | 0 |
| 11 | 6 | 7 | 5 | 3 |
| 12 | 8 | 8 | 5 | 0 |
| 13 | 2 | 7 | 6 | 3 |
| 14 | 8 | 8 | 6 | 0 |
| 15 | 8 | 8 | 7 | 0 |

| r | x1 | x2 | y | LA |
|---|---|---|---|---|
| 1 | 2 | 3 | 2 | 1 |
| 2 | 4 | 5 | 2 | 1 |
| 3 | 2 | 5 | 3 | 1 |
| 4 | 2 | 3 | 4 | 1 |
| 5 | 4 | 5 | 4 | 1 |
| 6 | 6 | 7 | 4 | 2 |
| 7 | 6 | 7 | 5 | 2 |
| 8 | 2 | 7 | 6 | 2 |

| y | LA | m | $c_R1$ | $c_R2$ | ... | $c_RM$ |
|---|---|---|---|---|---|---|
| 1 | 1 | 1 | 2 | – | ... | – |
| 2 | 2 | 1 | 1 | – | ... | – |
| 3 | 3 | 0 | – | – | ... | – |

| CODE | CONDITION | | RUN | | | LABELING | | STATUS | | TRANSITION | |
|---|---|---|---|---|---|---|---|---|---|---|---|
| | [b,a] | bx | x1 | x2 | | LA | c | a0' | Δi | Δj | [b,a]' |
| P | ① | | — | — | | — | — | R1.x2 | — | — | ① |
| | ② | | — | — | | — | ℓ1,ℓ2 | R2.x1 | 2 | — | ③ |
| | ③ | | — | — | | — | ℓ1 | R1.x1 | — | — | ③ |
| V(0) | ① | | R1.x1 | — | | ℓ1 | — | x1 | — | — | ① |
| | ② | | — | R1.x2 | | ℓ1 | ℓ1 | x2 | — | — | ③ |
| | ③ | | — | R0.x2 | | — | — | x2 | — | — | ③ |
| V_R(1) | ① | *0 | R1.x1+1 | — | | ℓ1 | ℓ1 | x1 | — | — | ① |
| | | *1 | R1.x1+1 | — | | ℓ1 | — | x1 | — | — | ① |
| | ② | *0 | — | R1.x2+1 | | — | — | x2 | 2 | — | ③ |
| | | *1 | — | R1.x2+1 | | — | ℓ1,ℓ2 | x2 | — | — | ② |
| | ③ | *0 | — | R0.x2+1 | | — | ℓ1 | x2 | — | — | ③ |
| V_R(2) | ① | *0 | R1.x1+2 | — | | ℓ1 | ℓ1 | x1 | — | — | ① |
| | | *1 | R1.x1+2 | — | | ℓ1 | — | x1 | — | — | ① |
| | ② | *0 | — | R1.x2+2 | | — | — | x2 | 2 | — | ③ |
| | | *1 | — | R1.x2+2 | | — | ℓ1,ℓ2 | x2 | — | — | ② |
| | ③ | *0 | — | R0.x2+2 | | — | ℓ1 | x2 | — | — | ③ |
| V_R(3) | ① | *0 | R1.x1+3 | — | | ℓ1 | ℓ1 | x1 | — | — | ① |
| | | *1 | R1.x1+3 | — | | ℓ1 | — | x1 | — | — | ① |
| | ② | *0 | — | R1.x2+3 | | — | — | x2 | 2 | — | ③ |
| | | *1 | — | R1.x2+3 | | — | ℓ1,ℓ2 | x2 | — | — | ② |
| | ③ | *0 | — | R0.x2+3 | | — | ℓ1 | x2 | — | — | ③ |
| | | *1 | — | R0.x2+3 | | — | — | x2 | — | — | ① |

91 — CONDITION; 92 — RUN; 93 — LABELING; 94 — STATUS TRANSITION

Columns: 4-1, 4-2, 4-3, 4-4, 4-5, 4-6, ..., 4-27

FIG. 9B

| CODE | CONDITION | | RUN | | | LABELING | | STATUS TRANSITION | | | |
|---|---|---|---|---|---|---|---|---|---|---|---|
| | [b,a] | bx | x1 | | x2 | LA | c | aO' | Δi | Δj | [b,a]' |
| VL(1) | ① | 0* | R1.x1-1 | | — | ℓ+1 | — | x1 | — | — | ② |
| | | 1* | R1.x1-1 | | — | ℓ0 | — | x1 | — | — | ② |
| | ② | | — | | R1.x2-1 | — | ℓ1 | x2 | — | — | ① |
| | ③ | | — | | R0.x2-1 | — | — | x2 | — | — | ① |
| VL(2) | ① | 0* | R1.x1-2 | | — | ℓ+1 | — | x1 | — | — | ② |
| | | 10 | R1.x1-2 | | — | ℓ0 | — | x1 | — | — | ② |
| | | 11 | R1.x1-2 | | — | ℓ0 | — | x2 | — | — | ③ |
| | ② | 00 | — | | R1.x2-2 | — | — | x1 | — | — | ① |
| | | OTHERS | — | | R1.x2-2 | — | ℓ1 | x2 | — | — | ① |
| | ③ | | — | | R0.x2-2 | — | — | x2 | — | — | ① |
| VL(3) | ① | 0* | R1.x1-3 | | — | ℓ+1 | — | x1 | — | — | ② |
| | | 10 | R1.x1-3 | | — | ℓ0 | — | x1 | — | — | ② |
| | | 11 | R1.x1-3 | | — | ℓ0 | — | x2 | — | — | ③ |
| | ② | 00 | — | | R1.x2-3 | — | — | x1 | — | — | ① |
| | | OTHERS | — | | R1.x2-3 | — | ℓ1 | x2 | — | — | ① |
| | ③ | | — | | R0.x2-3 | — | — | x2 | — | — | ① |

FIG. 10

| 101 CODE | 102 [b,a] | 103 DETERMINANT | 104 bx 00 | 10 | 01 | 11 |
|---|---|---|---|---|---|---|
| $V_R(1)$ | ① | R1.x2-R1.x1-1 | 0 | 0 | + | + |
|  | ② | R2.x1-R1.x2-1 | + | + | 0 | 0 |
|  | ③ | R1.x1-R0.x2-1 | + | + | 0 | 0 |
| $V_R(2)$ | ① | R1.x2-R1.x1-2 | 0 | 0 | + | + |
|  | ② | R2.x1-R1.x2-2 | + | + | 0 | 0 |
|  | ③ | R1.x1-R0.x2-2 | + | + | 0 | 0 |
| $V_R(3)$ | ① | R1.x2-R1.x1-3 | 0 | 0 | + | + |
|  | ② | R2.x1-R1.x2-3 | + | + | 0 | 0 |
|  | ③ | R1.x1-R0.x2-3 | + | + | 0 | 0 |
| $V_L(1)$ | ① | R1.x1-R0.x2-1 | + | 0 | + | – |
| $V_L(2)$ | ① | R1.x1-R0.x2-2 | 0 | * | + | + |
|  | ② | R1.x2-R1.x1-1 | + | 0 | * | – |
| $V_L(3)$ | ① | R1.x1-R0.x2-3 | + | 0 | * | + |
|  | ② | R1.x2-R1.x1-2 | 0,– | * | + | + |

FIG. 16A

STANDARD CCITT TEST DOCUMENT

| CODE | [b,a] | bx | NO.1 | NO.2 | NO.3 | NO.4 | NO.5 | NO.6 | NO.7 | NO.8 | AVERAGE |
|---|---|---|---|---|---|---|---|---|---|---|---|
| P | ① | | 1.2k | .4 | 2.2 | 5.5 | 2.5 | .7 | 5.9 | .7 | 2.4 |
| P | ② | | .2 | .1 | .4 | 1.1 | .5 | .3 | 1.4 | .1 | .5 |
| P | ③ | | .8 | .2 | 1.3 | 3.9 | 1.3 | .5 | 3.8 | .3 | 1.5 |
| V(0) | ① | | 12.1 | 7.9 | 22.7 | 40.5 | 24.4 | 16.7 | 35.0 | 13.4 | 21.6 |
| V(0) | ② | | 2.0 | 1.2 | 3.4 | 7.0 | 4.3 | 2.3 | 6.1 | 1.7 | 3.5 |
| V(0) | ③ | | 7.9 | 4.3 | 16.1 | 31.7 | 18.7 | 11.8 | 26.5 | 10.3 | 15.9 |
| $V_R(1)$ | ① | 0* | .0 | .0 | .0 | .0 | .0 | .0 | .1 | .0 | .0 |
| $V_R(1)$ | ① | *−1 | 4.0 | 2.0 | 6.5 | 15.9 | 7.5 | 3.2 | 11.2 | 4.7 | 6.9 |
| $V_R(1)$ | ② | 0* | .9 | .4 | 1.1 | 4.7 | 1.8 | .5 | 1.7 | .7 | 1.5 |
| $V_R(1)$ | ② | *−1 | .0 | .0 | .0 | .0 | .0 | .0 | .0 | .0 | .0 |
| $V_R(1)$ | ③ | 0* | 3.1 | 1.7 | 5.6 | 12.2 | 5.7 | 3.0 | 8.3 | 4.2 | 5.5 |
| $V_R(1)$ | ③ | *−1 | .0 | .0 | .2 | .1 | .1 | .0 | .2 | .0 | .1 |
| $V_R(2)$ | ① | 0* | .0 | .0 | .0 | .0 | .0 | .0 | .0 | .0 | .0 |
| $V_R(2)$ | ① | *−1 | .7 | .4 | .6 | .6 | .8 | .2 | 1.7 | 1.2 | 1.0 |
| $V_R(2)$ | ② | 0* | .3 | .1 | .4 | .4 | .5 | .1 | .6 | .0 | .6 |
| $V_R(2)$ | ② | *−1 | .0 | .0 | .0 | .0 | .0 | −.1 | −.1 | −.1 | .0 |
| $V_R(2)$ | ③ | 0* | .4 | .2 | .3 | .3 | .5 | .1 | 1.3 | .3 | .6 |
| $V_R(2)$ | ③ | *−1 | .0 | .0 | −.1 | −.1 | .0 | .0 | .0 | .0 | .0 |
| $V_R(3)$ | ① | 0* | .0 | .0 | .0 | .0 | .0 | .0 | .0 | .0 | .0 |
| $V_R(3)$ | ① | *−1 | .2 | −.1 | −.1 | −.1 | −.1 | .0 | .5 | .5 | .3 |
| $V_R(3)$ | ② | 0* | −.1 | .0 | .0 | .0 | .0 | .0 | .2 | −.1 | .2 |
| $V_R(3)$ | ② | *−1 | .0 | .0 | −.1 | −.1 | .0 | .0 | .0 | .0 | .0 |
| $V_R(3)$ | ③ | 0* | .0 | .0 | .0 | .0 | .0 | .0 | .3 | .3 | .1 |
| $V_R(3)$ | ③ | *−1 | .0 | .0 | .0 | .0 | .0 | .0 | .0 | .0 | .0 |

FIG. 16B

| CODE | [b,a] | bx | STANDARD CCITT TEST DOCUMENT ||||||||| |
| --- | --- | --- | --- | --- | --- | --- | --- | --- | --- | --- | --- |
| | | | NO.1 | NO.2 | NO.3 | NO.4 | NO.5 | NO.6 | NO.7 | NO.8 | AVERAGE |
| $V_L(1)$ | ① | 0* | 3.9 | 2.6 | 6.3 | 6.3 | 8.0 | 4.9 | 13.3 | 3.3 | 7.2 |
| | | 1* | .0 | .0 | .2 | .2 | .1 | .1 | .3 | .0 | .1 |
| | ② | | 1.1 | 1.1 | 2.0 | 2.0 | 2.1 | 2.1 | 5.7 | .8 | 2.3 |
| | ③ | | 2.8 | 1.4 | 4.9 | 4.9 | 5.0 | 2.8 | 9.5 | 2.5 | 5.0 |
| $V_L(2)$ | ① | 0* | .8 | .6 | .7 | .7 | 1.2 | .7 | 2.2 | .5 | 1.3 |
| | | 10 | .0 | .0 | .0 | .0 | .0 | .0 | .1 | .0 | .0 |
| | | 11 | .0 | .0 | .0 | .0 | .0 | .0 | .0 | .0 | .0 |
| | ② | 00 | .0 | .0 | .0 | .0 | .0 | .0 | .0 | .0 | .0 |
| | | OTHERS | .1 | .3 | .1 | .3 | .1 | .4 | 1.1 | .1 | .3 |
| | ③ | | .5 | .3 | .6 | .6 | .8 | .3 | 1.8 | .3 | .8 |
| $V_L(3)$ | ① | 0* | .2 | .2 | .2 | .2 | .3 | .1 | .9 | .2 | .0 |
| | | 10 | .0 | .0 | .0 | .0 | .0 | .0 | .0 | .0 | .0 |
| | | 11 | .0 | .0 | .0 | .0 | .0 | .0 | .0 | .0 | .0 |
| | ② | 00 | .0 | .0 | .0 | .0 | .0 | .0 | .0 | .0 | .0 |
| | | OTHERS | .0 | .1 | .1 | .2 | .2 | .1 | .3 | .0 | .2 |
| | ③ | | .2 | .1 | .1 | .2 | .2 | .1 | .8 | .1 | .0 |
| H | ① | | 1.6 | .8 | 2.8 | 2.8 | 3.1 | 1.2 | 9.0 | 1.1 | 3.3 |
| | ② | | .7 | .2 | .7 | .7 | .8 | .3 | 2.0 | .3 | .9 |
| | ③ | | 1.1 | .5 | 1.9 | 1.9 | 1.8 | .9 | 5.2 | .8 | 2.1 |
| TOTAL | | | 46.9 | 27.3 | 81.7 | 179.9 | 92.7 | 53.5 | 156.9 | 49.7 | 85.7 |

FIG.17

| PROCESS | THROUGHPUT TIME (SECOND) | | | | | | | | |
|---|---|---|---|---|---|---|---|---|---|
| | NO.1 | NO.2 | NO.3 | NO.4 | NO.5 | NO.6 | NO.7 | NO.8 | AVERAGE |
| PHASE I | 0.89 | 0.51 | 1.51 | 3.38 | 1.65 | 1.00 | 3.18 | 0.80 | 1.45 |
| PHASE II | 0.14 | 0.08 | 0.20 | 0.51 | 0.25 | 0.15 | 0.48 | 0.11 | 0.24 |
| TOTAL | 1.03 | 0.59 | 1.71 | 3.89 | 1.90 | 1.15 | 3.66 | 0.91 | 1.69 |

IMAGE DATA PROCESSING METHOD AND SYSTEM FOR GIVING IDENTIFICATION LABELS TO AREAS OF CONNECTED BLACK PICTURE ELEMENTS

BACKGROUND OF THE INVENTION

1. Field of the Invention

The present invention relates to an image data processing method and system, and more particularly to an image data processing method and system for successively giving identification labels to the individual the clusters (or areas) of connected black (or white) picture elements. The present invention is applicable to, for example, a processing for recognition of binary images.

2. Description of the Related Art

For example, in OCR (optical character reader) or drawing recognition apparatus, a labelling process for successively labelling the individual areas (or clusters) of connected black picture elements is generally performed as a preprocessing in order to extract separate characters or symbols included in image data. An example of the labelling process is illustrated in FIGS. 1A and 1B. FIG. 1A shows the original image $IM_O$ including lattice elements called picture elements. Shaded picture elements $E_B$ represent black elements and clear picture elements $E_W$ represent white elements. FIG. 1B shows one example of the result of a labelling process in which area identification numbers (or labels) are given to the areas $S_1$ and $S_2$ of connected black elements, respectively. A numeral "1" or "2" in each black element represents a label. The shown notation is employed for clarification of the purpose of the process though the result of labelling is not necessarily represented by the shown label table in units of one picture element. Coordinates x and y defined as shown are used in the following explanation.

A typical one of the conventional labelling methods is, for example, a method described as the prior art in Section 2.1 of the Goto et al's article entitled "High Speed Algorithm for Component Labelling", Proceedings of the Institute of Electronics, Information and Communication Engineers of Japan, D-II, Vol. 72, No. 2, pp. 247-255, February 1989. This method includes making the decision of color for every picture element in the original image $IM_O$ and examining in the case of a black element the connectivity (or condition of connection) of that black element under consideration with the surrounding element so that in the case where the black element under consideration is connected with a black element having already been provided with a certain label, the black element under consideration is provided with the same label as the certain label and in the case where the black element under consideration is further connected with a black element provided with another label, there is memorized the condition for the abovementioned or certain label and the other label that they should be the same primarily (first process). After the first process has been performed for all of the picture elements, the labels and the above-mentioned relationship of connection are examined for every picture element to correct the labels of picture elements which are provided with different labels notwithstanding that they should be provided primarily with the same label (second process). In the example shown in FIG. 1A, two black elements in the 2nd row are firstly provided with labels of different values but are relabelled in the second process so as to have the same label value.

According to the above prior art, the first process requires a processing time for decision of element color which is proportional to the total number of picture elements and a processing time for decision of connectivity which is proportional to the number of black elements, and the second process requires a processing time for decision of the presence/absence of label which is proportional to the total number of picture elements and a processing time for updating of label which is proportional to the number of black elements. Owing to these processings, for example, in the case where an image obtained by digitalizing a standard CCITT (Comité Consultatif International des Télégraphique et Téléphonique) A4-size test document at 8 elements/mm is subjected to a labelling process, for example, with the Motorola 68020 microprocessor being operated at the clock of 20 MHz, the conventional labelling method requires a total processing time of several seconds to ten and several seconds.

In the case where documents or drawings are to be recognized, such a time consumed for the labelling process becomes an obstacle to the shortening of an image processing time.

SUMMARY OF THE INVENTION

An object of the present invention is to provide an image data processing method and system in which image data coded by a modified READ (MR) system is made the object of labelling, thereby enabling a high-speed labelling process.

Another object of the present invention is to provide a high-speed image data processing method and system which is capable of outputting the result of a labelling process in parallel with the supply of image data coded by an MR system.

A further object of the present invention is to provide an image data processing method and system which is capable of performing a labelling process without using a large capacity of memory for storing decoded image data for one image.

To that end, according to one aspect of the present invention, image data compressed by MR coding is analyzed in units of one code word and a process for labelling of an area including black elements or white elements, which are connected with each other on the original image, is performed directly from each analyzed code word or a predetermined number of analyzed code words in accordance with a predetermined rule.

For the above labelling, in the present invention, a relationship between one coding (black or white) run which is included in a coding line $L_C$ being coded by a code word under consideration (a code word analyzed or a code word being processed) and a group of picture elements which exist on a reference line $L_R$ situated just before the coding line $L_C$ and are adjacent to the coding run, is managed by several control parameters. The control parameters include, for example, [b, a] representative of a relationship between the color a of the 1st or leading picture element of the coding run and the color b of a picture element situated on the reference line $L_R$ at a position corresponding to the leading picture element of the coding run, and bx representative of a relationship between the color bx1 of a picture element situated on the reference line at a position corresponding to the last picture element of the coding run and the color bx2 of a picture element situated on the reference line next to the picture element of color bx1.

In the present invention, in accordance with the combination of a supplied code word and the conditions of the control parameters, a run table for storing a relationship between runs and labels and a connection table for storing a relation of connection or unification of labels are updated and the condition of control parameter(s) necessary for a processing of a code word to be next supplied is updated.

In the labelling process, an area (or run) of connected black or white elements on each (coding) line of the image is provided with a primary or provisional label having the same value as a label value of a run on a processed (or reference) line which is connected with the run under consideration on the coding line. After the primary labelling has been completed for one image, secondary labelling or relabelling is made so that two or more labels of different values assigned to the same area or cluster of connected black or white elements are corrected so as to have the same label value.

The modified READ system (hereinafter abbreviated as MR system), to which the present invention is applicable, is widely utilized at present as a system for compressing or reducing the amount of data, for example, in the case where an image is transmitted by a facsimile equipment or in the case where an image is stored in an optical disk device. In the present invention, the labelling process is performed making MR coded image data the object of labelling. Therefore, a code expansion process is not necessarily required in recognizing an image which is read from a file such as an optical disk, an image which is transmitted through a facsimile or an image which is fetched from an image input device connected to a network or delicated cable. Also, in the present invention, the labelling process can be performed in parallel with a process for restoring MR coded image data to the original image data.

According to the present invention, a time required for the labelling process is approximately proportional to the number of code words. The total number of picture elements on the original image increases at an order which is equal to the second power of the number of picture elements along one side of the image. On the other hand, the number of code words forming one coded image corresponding to the original image generally increases at an order which is smaller than the second power of the number of picture elements along one side of the image and larger than the first power thereof. For example, in the case of the abovementioned standard CCITT test document, the number of code words is 1/20 to 1/150 (about 1/50 in average) of the number of white elements and ⅓ to 1/36 (about ⅓ in average) of the number of black elements. This difference in number between code words and picture elements becomes further remarkable as the sampling density for digitalization is increased. Therefore, according to the policy of the present invention of performing a labelling process directly from coded image data, a processing time is greatly shortened as compared with the conventional method.

The constant of proportion for a time required for the labelling process in the present invention is the sun of a time required for analyzing one code word, a time required for selecting an individual process to be performed in accordance with the code word and a time required for updating the connection table and other information. The code word analysis can be made by referring to only a code table. The process selection can be made by holding the status of the control parameter, for example, [b, a] as mentioned above. The updating of information can be made by referring to only the run table, control parameters and other common parameters necessary for the process to be performed and need not make reference to the image data.

The foregoing and other objects, advantages, manner of operation and novel features of the present invention will be understood from the following detailed description when reading in connection with the accompanying drawings.

BRIEF DESCRIPTION OF THE DRAWINGS

FIG. 1A shows one example of image data to be subjected to a labelling process.

FIG. 1B shows the result of labelling made for the image shown in FIG. 1A.

FIG. 2A is a block diagram showing the construction of an image processing system for embodying the present invention.

FIG. 5 shows a sequence of MR codes by way of example.

FIG. 7A shows one example of the contents of a run table 50' in a phase I.

FIG. 7B shows one example of the contents of a connection table 70.

FIG. 7C shows one example of the contents of a run table 50 at the point of time of end of a phase II.

FIGS. 8A and 8B are a table for explaining varius connection conditions of runs in PASS and VERTICAL modes.

FIGS. 9A and 9B are a table for explaining the contents of processes performed by individual update process routines in the PASS and VERTICAL modes.

FIG. 10 is a table for explaining a method of decision of conditions of a parameter bx.

FIGS. 16A and 16B are a table showing the frequency distribution of codes, statuses and conditions in standard CCITT test documents.

FIG. 17 is a table showing one example of processing times required in the present invention.

DESCRIPTION OF THE PREFERRED EMBODIMENTS

Figure 2B:
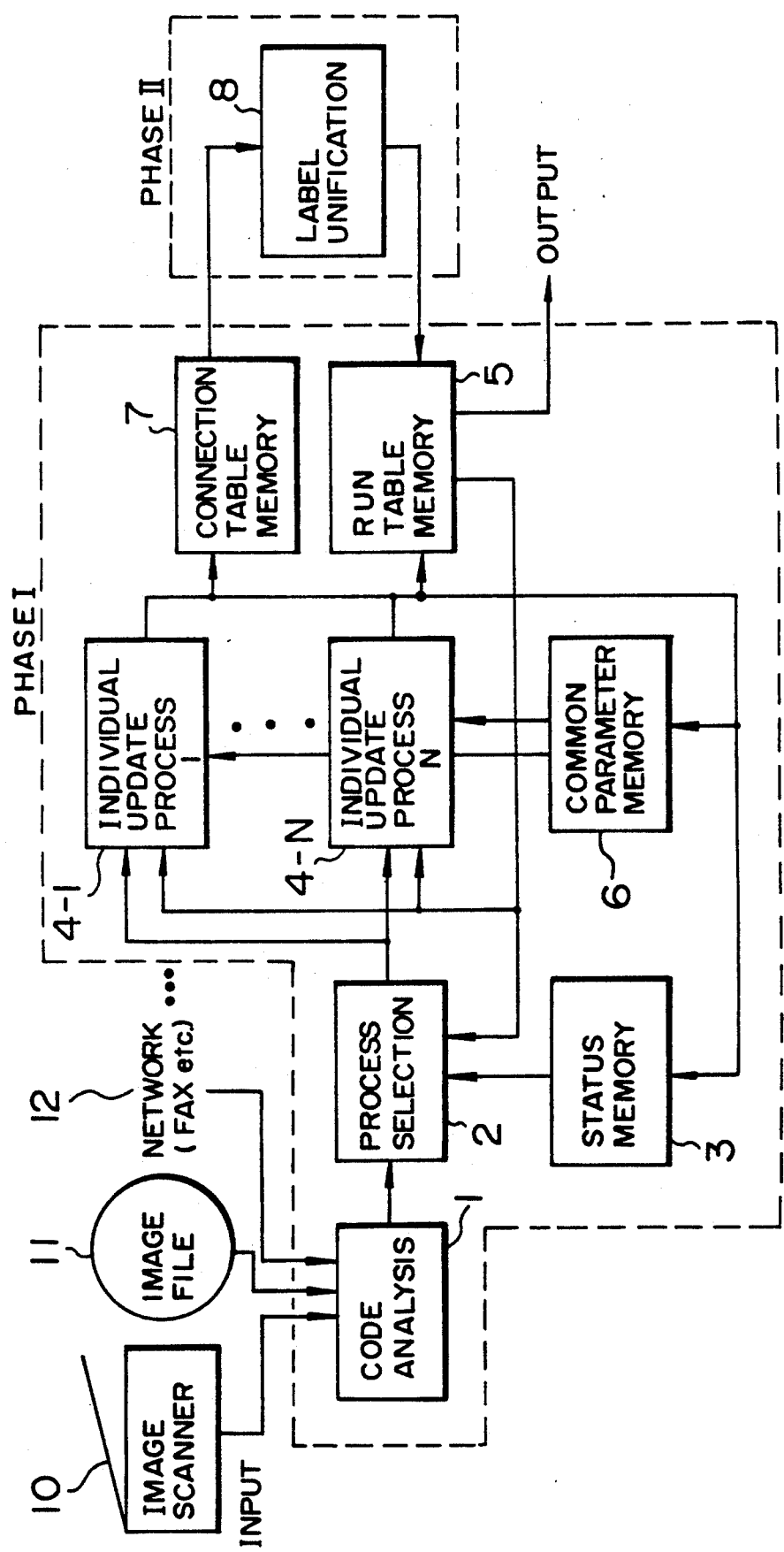
FIG. 2B is a functional block diagram of the image processing system according to the present invention.

FIG. 2A is a block diagram showing the general construction of an image processing system for embodying the present invention. The image processing system comprises a image scanner 10, an image file 11, a disk controller 11A for making access to the image file 11, an interface 12A for connection to a network 12, a processor (CPU) 13, a memory 14 for storing a program to be executed by the processor 13, various data and tables, etc., a display 15A, a keyboard 15B, and a bus 16 for interconnecting the above components.

FIG. 2B shows a functional block diagram of the image processing system shown in FIG. 1. In FIG. 2B, a portion enclosed by a broken line represents a relationship between the functions of program modules executed by the CPU 13 and various tables prepared in the memory 14. The operation of a processing performed by the CPU 13 is broadly divided into a first phase I and a second phase II.

Explanation is firstly made of the first phase I. An image coded by an MR system is inputted from, for example, the image scanner 10. Alternatively, such an image can be obtained through a processing for search of the fill 11 such as a disk or a processing for read by a facsimile or remote image input device connected to the network or delivated cable 12. The inputted image is successively analyzed by a code analysis routine 1 and is sent to a process selection routine 2 in units of one code word. On the basis of the code word sent from the code analysis routine 1 and the contents of a status memory 3 which will be mentioned later on, the process selection routine 2 selects a process to be next performed from among individual update process routines 4-1 to 4-N. The status memory 3 manages which one of later-mentioned statuses ①  to ③ is the status of a labelling system. The status of the labelling system is initialized into the status ① at the lead of each line and is thereafter updated successively by the selected individual update process routines 4-1 to 4-N. On the basis of the contents of a run table memory 5 and a common parameter memory 6 which will be mentioned later, one of the individual update process routines 4-1 to 4-N updates the contents of the status memory 3, the run table memory 5, the common parameter memory 6 and a connection table memory 7 in accordance with respective predetermined rules.

The run table memory 5 manages information indicating the position of each run in the image, that is, the position of a cluster (or run) of laterally connected black elements, and the value of a label given to the run. The common parameter memory 6 manages parameters i and j for indicating a run in the run table memory 5 necessary for a process at that point of time and a parameter a0 for indicating a position on the original image to which a code word being processed corresponds. The connection table memory 7 manages sets of those ones of labels stored in the run table memory 5 which are to be connected (or unified).

The above processing is repeated for all code words which form one image.

In the second phase II, a label unification routine 8 updates the contents of the run table memory 6 on the basis of the contents of the connection table memory 7 obtained in the first phase I. Namely, the label unification routine 8 determines the conditions of unification of labels from the contents of the connection table memory 7 and updates the values of labels in the run table memory 6 on the basis of the determined conditions. The contents of the run table memory 6 ultimately obtained are outputted as the result of an image labelling process according to the present embodiment.

Next, the contents of a process performed by the code analysis routine 1 will be explained in detail. The code words of an image analyzed in the present invention is of a modified READ (MR) system. The coding by the MR system is widely known as a data compression system suitable for the case where an image is transmitted by a facsimile equipment or the case where an image is stored in an optical disk device. The details of the MR system are described by, for example, the Hunder et al's article entitled "International Digital Facsimile Coding Standards", Proceedings of the IEEE, Vol. 68, No. 7, pp. 854-867, July 1980. In the MR system, image data of each line of the original image is coded referring to image data of a line (hereinafter referred to as a reference line) which immediately precedes that line being coded (hereinafter referred to as a coding line) and has already been coded. For example, in the case where lines having the same contents appear continuously on the original image, each succeeding line is provided with a predetermined code word indicating that "the contents are the same as those of the preceding line", thereby attaining a high data compression ratio.

Figures 3, 4:
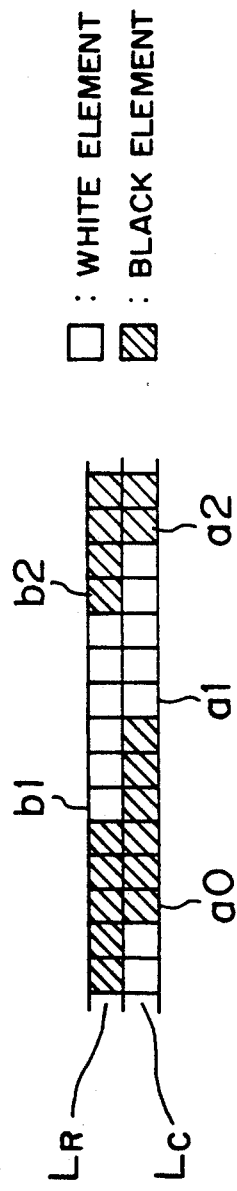
FIG. 3 is a diagram showing a relationship between a reference line $L_R$ and a coding line $L_C$ for explaining a coding scheme according to an MR system.
FIG. 4 is a table showing a relationship between conditions of parameters and codes in the MR system.

FIG. 3 shows the essential point of the MR system. In the figure, the upper line $L_R$ represents a reference line and the lower line $L_C$ represents a coding line. In the MR coding it is assumed that when image data of the 1st line of each image is to be coded, image data of the 0-th line serving as a reference line consists of only white elements.

In the present invention, several control parameters are used for performing a labelling process. A parameter having as its initial value the position of the 1st picture element in each line or the position of each picture element in the 1st column of the original image is defined by a0. The parameter a0 is provided for indicating the lead of a "unit" which will be mentioned later on, and the value of the parameter a0 is managed by the common parameter memory 5. As shown in FIG. 3, the position of a white-to-black or black-to-white changing picture element on the coding line $L_C$ appearing after a0 is defined by a1 and the position of a changing picture element appearing next to a1 is defined by a2. On the reference line $L_R$, the position of a changing picture element lying on the right side of a0 and exhibiting the same change as a1 is defined by b1 and the position of a changing picture element having the same change as a2 is defined by b2. At this time, a coding mode 42, a code 43 given to a run between a0 and a1, the value 44 of next a0 are uniquely determined in accordance with a condition 41 shown in FIG. 4. For example, when b2<a1, the mode is called a PASS mode, the code is P and the value of next a0 is b2. Since the specific representation of codes such as P, V(0), etc. by bit patterns is described in detail on page 865 of the article referred to in the above, explanation thereof will be omitted herein.

FIG. 5 shows one example of a sequence of MR codes obtained from the actual image, more especially, the image shown in FIG. 1A. In FIG. 5, symbol t represents the order of codes. Symbol y represents the coordinate y shown in FIG. 1A and is shown for facilitating the understanding of a corresponding relationship between FIGS. 1A and 5 though it is not included in the actual code.

The code analysis routine 1 successively reads the MR code bit sequences thus produced and refers to a beforehand prepared table representative of correspondence between each code and a bit pattern to output code words one by one in accordance with the order indicated by t.

Figure 6A:
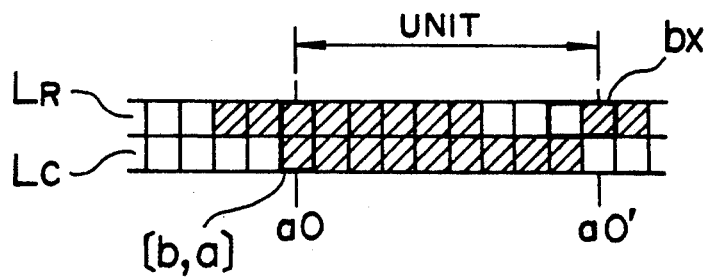
FIGS. 6A and 6B are diagrams for explaining the definition of symbols used for explanation of a labelling process according to the present invention.

Next, symbols and terms used in the following explanation of the labelling process will be explained in reference to FIGS. 6A and 6B. In these figures, the upper line represents a reference line $L_R$ and the lower line represents a coding line $L_C$. As shown in FIG. 6A, a portion between the center position of a picture element indicated by a0 (above explained in conjunction with the MR coding) at a certain point of time and the center portion of a picture element indicated by a0' which newly becomes a0 at the next point of time, is termed a "unit" in the present specification. The color of a picture element situated on the reference line $L_R$ at the position of a0 and the color of a picture element situated on the coding line $L_C$ at the position of a0 are represented by b and a, respectively, and the combination [b, a] of b and a is stored as one of control parameters in the status memory 3. The before-mentioned status ① indicates a status in which [b, a] is [*, 0], that is, a is white (W) and b may be either black (B) or white (W), the status ② indicates a status in which [b, a] is [0, 1], that is, a is lack (B) and b is white (W), and the status ③ indicates a status in which [b, a] is [1, 1], that is, a and b are both black (B). Also, the color of a picture element situated on the reference line $L_R$ at the position of (a0'−1) and the color of a picture element situated on the reference line $L_R$ at the position of a0' are represented by bx1 and bx2, respectively, and the combination of bx1 and bx2 is represented by a condition bx which is another one of the control parameters.

As apparent from FIG. 6A, the condition bx indicates how did the picture elements on the reference line $L_R$ change at the position of the final picture element in a run under consideration on the coding line $L_C$.

Figure 6B:
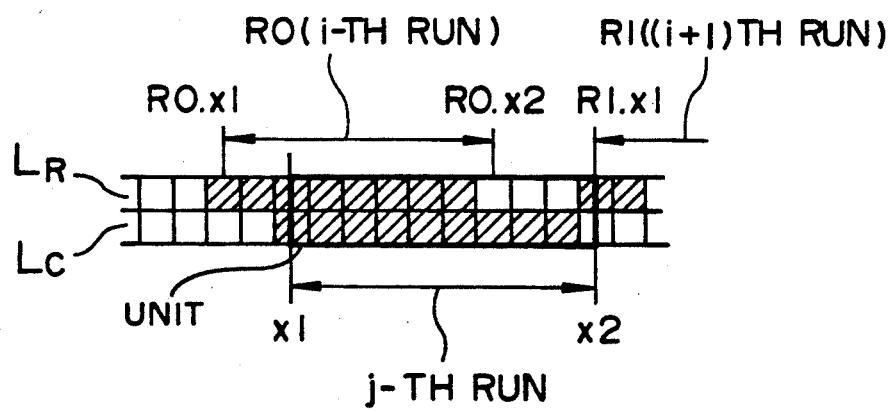

Further, an index indicating a black run on the coding line $L_C$ continuing from a black element preceding a unit under consideration is represented by j, as shown in FIG. 6B. The value of j is managed by the common parameter memory 6 and corresponds to the run number of each run stored in the run table memory 5. In principle, i is an index indicating a black run on the reference line $L_R$ continuing before the unit. However, only when the MR code is a HORIZONTAL mode, there may be the case where i is updated in the unit under consideration, as will be mentioned in later. The value of i is also managed by the common parameter memory 6 and corresponds to the run number of each run stored in the run table memory 5. On the coding line $L_C$, only at most one run exists in one unit. On the reference line $L_R$, however, two or more runs may exist in an area corresponding to the above-mentioned unit. Runs on the reference line $L_R$ having indices i and (i+1) are defined by R0 and R1, respectively. Similarly, a run having an index (i+k) is defined by Rk. The x coordinate of a start point of an arbitrary run included in the coding line $L_C$ is defined by x1, the value of the x coordinate of an end point of that black run plus one is defined by x2, the x coordinate of a start point of a black run Rk included in the reference line $L_R$ is defined by Rk.x1, and the value of the x coordinate of the black run Rk plus one is defined by Rk.x2.

FIGS. 7A to 7C show one example of the constructions and contents of a run table 50 and a connection table 70 formed in the run table memory 5 and the connection table memory 6. The contents of each table corresponds to the example of the image $IM_O$ shown in FIG. 1A.

FIG. 7A shows the contents of the run table 50' at the point of time of completion of a processing in the phase I. In the table, r' represents the run number of each run at the point of time of completion of the processing in the phase I, x1 the value of the x coordinate of a start point of each black run, x2 the value of the x coordinate of an end point of each black run plus one, y the value of the y coordinate of each run, and LA a label given to each run. In the present embodiment, in order to unifactively handle a process for a line at the right end thereof, it is assumed that each line includes on the right outside of image a run having a length of 0 (zero), as will be mentioned later on. In the table 50', this imaginary run has the label (LA) value equal to 0 so that it is distinguished from the other runs. The same value is given to x1 and x2 of the imaginary run. In the shown example, the first, fourth, sixth, tenth, twelfth, fourteenth and fifteenth runs correspond to the imaginary runs.

FIG. 7B shows the contents of the connection table 70 at the point of time of completion of a processing in the phase I. In the figure, LA represents the value of a label given to each run shown in FIG. 7A, and m represents the number of labels which have different values from each other now but are to be unified with the same label later. $C_R1$ to $C_RM$ represent the value of a label to be unified with the same label. In the shown example, the labels 1 and 2 given to two runs lying on the 2nd line (y=2) have a relationship that they should be unified, and the values of labels 2 and 1 are stored as the objects of unification in the table for the labels 1 and 2, respectively. A postscript M added to $C_R$ indicates the maximum number of labels to be unified. The maximum possible number of storage areas may be prepared beforehand in the table 70. Alternatively, a limited number of storage areas may be prepared for reduction of the memory capacity of the table. In this case, when there generate the unifications whose number exceeds the limited number of storage areas, the excess is stored in an overflow area with its address being designated by a pointer.

FIG. 7C shows the contents of the run table 50 at the point of time of completion of a processing in the phase II. In FIG. 7C, r represents the run number of a run at the point of time of completion of the processing in the phase II, and x1, x2, y and LA represent the same contents as those shown in FIG. 7A. The contents of the table 50 are such that the runs having the LA value of 0 are removed from the table 50' and relabelling (updating of label values) is made for runs designated for label unification by the connection table 70 so as to have the same label. In the shown example, the labels 1 and 2 in the table 50' are unified to have the same label 1 and the label 3 is changed to a new label 2.

Next, explanation will be made of the contents of the individual update processes in the case where the result of the processing by the code analysis routine 1 is a PASS mode or a VERTICAL mode.

Figure 8A:
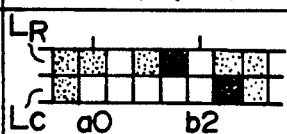
Figure 8B:
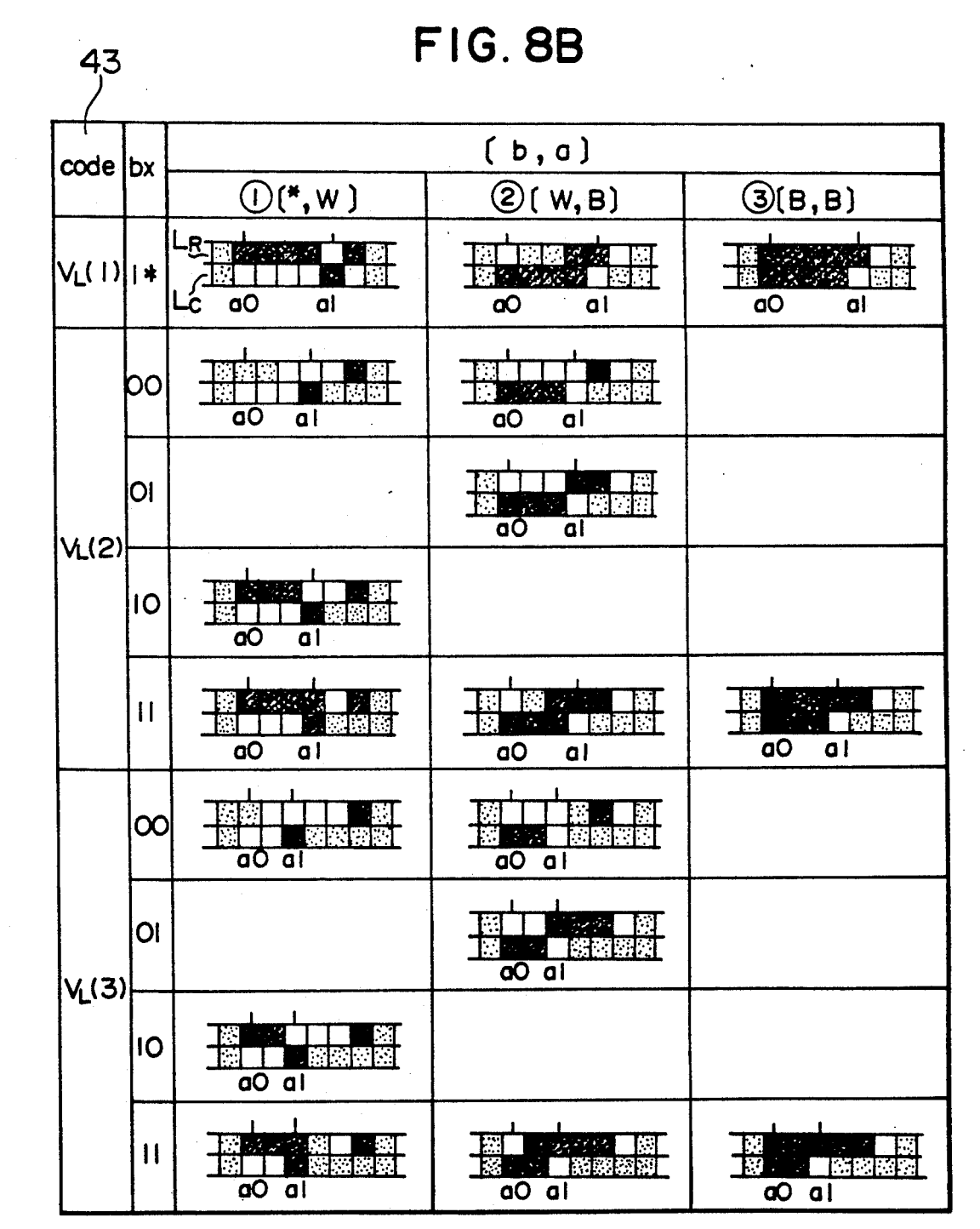

FIGS. 8a and 8B show for each code 43 the condition of connection of runs in correspondence to the condition bx and the combination [b, a] or statuses ① to ③ as explained in conjunction with FIG. 6A. In FIGS. 8A and 8B, two short line segments shown above the reference line $L_R$ represent the range of the abovementioned unit and two symbols shown below the coding line $L_C$ represent parameters of the MR code as explained in conjunction with FIG. 3. The left parameter is a0 and the right parameter a1 or b2 is a parameter which becomes the new position of a0 when the next code word is to be processed, that is, a parameter which corresponds to a0' shown in FIG. 6A. A hatched rectangle represents a black element, a white rectangle represents a white element, a series of reticulated rectangles sandwiched between a black element and a white element represent a series of picture elements whose color changes from white to black once at most, a series of reticulated rectangles sandwiched between a white element and a black element represent a series of picture elements whose color changes from black to white one at most.

For example, when the code is P and the status [b, a] is ①, the coding line $L_C$ includes no run in the unit under consideration and the reference line $L_R$ includes only one run which has its start and end points in the unit under consideration, as apparent from the definition explained in conjunction with FIG. 4. When the code is P and the status is ②, the coding line $L_C$ includes a run which continues from the preceding unit and to the next unit and the reference line $L_R$ includes one run which has its start and end points in the unit under consideration and one run which has a start point in the unit under consideration and an end point in the next unit. In this case, it is understood that the two runs on the reference line $L_R$ and the run on the coding line $L_C$ are connected with each other and should be provided primarily with the same label. When the code is $V_R(1)$, the condition bx is (*, 0) or bx2 is white (and bx1 may be either white or black) and the status is ①, the coding line $L_C$ includes only one run which starts in the unit under consideration and continues to the next unit and the reference line $L_R$ includes one run which has its start and end points in the unit under consideration and is connected with the run on the coding line $L_C$ and at most one run which continues from the preceding unit but is not connected with the run on the coding line $L_C$. In this case, it is understood that the former run on the reference line $L_R$ and the run on the coding line $L_C$ should be provided primarily with the same label.

FIGS. 8A and 8B represent all logical run connection relations though all of runs physically appearing in the actual field of applications are not covered. A blank section in the figures means that the corresponding case is not present. For example, when the code is $V_L(1)$ and the status is ③, a run pattern uniquely results in a pattern shown in the case where the code is $V_L(1)$, the condition bx is (1, *) and the status is ③. Accordingly, there is no case where the condition bx becomes (0, *). In the present embodiment, the connection of black elements employs an octaconnection scheme in which two black element adjacent to each other in an oblique direction of 45° are defined as being connected irrespective of the conditions of the surrounding white elements. However, the present invention is also applicable to a quadri-connection scheme in which two adjacent black elements in an oblique 45° direction are defined as being not connected in the case where two picture elements adjoining the two black elements are both white, or another special connection scheme.

Depending upon the combination of the code, the condition bx and the status [b, a], the process selection routine 2 selects one of the individual update process routines 4-1 to 4-N having a 1:1 correspondence to each section in FIG. 8 and three statuses of a HORIZONTAL mode which will be mentioned later on. A specific method for decision of the condition bx will be detailed later on.

FIGS. 9A and 9B show the contents of processes by the individual update process routines 4-1 to 4-N. Each of rows 4-1 to 4-43 in those figures corresponds to one of the individual update routines 4-1 to 4-N selected by the process selection routine 2. The contents of a processing performed in accordance with a condition 91 is classified into a process 92 (RUN) for coordinate updating of the run table 50, a process 93 (LABELLING) for label updating of the run table 50 and the connection table 70 and a process 94 (STATUS TRANSITION) for transition to the next status. In FIGS. 9A and 9B, a section marked with a symbol "—" shows that the corresponding process is not performed.

In the process 92 for coordinate updating of the run table 50, start point information x1 and end point information x2 in the run table 50 are updated, as required. A run to be subjected to update is indicated by an index j at that point of time. More especially, in the case where x1 is to be updated, the process is performed for a run situated at a table position indicated by j incremented from the present value by one. In the case where x2 is to be updated, the process is performed for a run situated at a table position indicated by the present value of j.

For example, when the code is V(0) and the status is ①, j is incremented by one. Next, reference to previously calculated run information R1.x1 on the same run table is made and the same value as R1.x1 is substituted for x1 of a run at a position indicated by j. The meaning of the symbol R1.x1 is as explained in conjunction with FIG. 6B. More particularly, the reference to R1.x1 can be made easily by determining the value of x1 for a run situated at a position on the run table 50 indicated by i incremented from a value at that point of time by one. When the code is $V_R(1)$, the condition bx is (*, 0) and the status is ③, reference to previously calculated run information R0.x2 on the same run table is made on the basis of the value of i at that point of time and a value obtained by adding one to R0.x2 is substituted for x2 of a run at a position indicated by j. the meaning of the symbol R0.x2, too, is as explained in conjunction with FIG. 6B. More particularly, the reference to r0.x2 can be made easily by determining the value of x2 for a run situated at a position on the run table indicated by i at that point of time.

In the above process, the value of y, too, is updated at the point of time of start of updating for a new run, that is, at that point of time when x1 is updated. The updating of the y value can be made by referring to the value of y coordinate of a line under processing on the image since the y coordinate value is always managed, as will be mentioned later on. The right end of each line on the image can be decided easily since the label value of a run to which reference is to be made is 0. This decision can be used as a line end condition. Line initialization and end processes will be mentioned later on.

In the process 93 for label updating of the run table 50 and the connection table 70, the label LA in the run table 50 and m (the number of labels to be unified) and $C_R1$ to $C_RM$ (the values of the labels to be unified) in the connection table 70 are updated, as required. A value into which the label LA is to be updated in the run table 50 is l0, l1 or l+1, as shown in a column LA in FIGS. 9A and 9B. The values l0 and l1 are labels which have already been given to the runs R0 and R1 defined in FIG. 6B. More particularly, those can be determined easily by referring to the label LA values of runs in the run table 50 situated at positions which are indicated by indices i and i+1, respectively. Also, l is a parameter which is managed by the connection table 7 independently from the parameters (LA, m, CR1-CRn) stored in the connection table 70 by the connection table memory 7. An initial value of l is 0 and the present value thereof is the maximum value among previously given labels. The updating of the label LA into l+1 means that the value of l is incremented by one and this incremented value is substituted for the label LA for a run under consideration.

A processing for updating m (the number of labels to be unified) and $C_R1$ to $C_RM$ (the values of the labels to be unified) in the connection table 70 is as shown in a list c of LABELLING 93 in FIGS. 9A and 9B for simplification. Labels in the list c show that they are to be unified with the label for a run being processed. For example, when the code is P and the status is ③, the label list c indicates l1. A process to be performed in the case is as follows. Firstly, the label lx for a run being processed is determined. Next, for an element on the connection table 70 having a label LA equal to lx, m is incremented by one and l1 is substituted for the position of $C_Rm$. Further, for an element on the connection table having a label LA equal to l1, m is incremented by one and lx is substituted for the position of $C_Rm$. When the code is P and the status is ②, the label list c indicates l1, l2. A process to be performed in this case is as follows. For each of the lx-th, l1-th and l2-th elements on the connection table, m is incremented by two, and l1, l2, lx and l2, lx, l1 are substituted for the positions $C_R(m-1)$ and $C_Rm$, respectively. The label lx for a run being processed can be determined as the label LA for a run on the run table to which reference is made by an index j. For high-speed implementation, the label for a run on the coding line being processed can be held always in the common parameter memory 6. l1 and l2 are labels which have already been given to the runs R1 and R2 defined in FIG. 6B. More particularly, those can be determined easily by referring to the label LA values of runs in the run table 50 which are indicated by indices i+1 and i+2, respectively.

In the present embodiment, for the unification of two labels, each of two relevant elements in the connection table 70 is provided in such a manner that one of the two labels to be unified with the (other) label for that element is written. This is made for simplification of the explanation of the second phase II of the labelling process. In the case where a processing in the phase II is modified, as will be mentioned later on, the writing into only one of the two elements or the writing of the label for the other element into the one element suffices. The above holds for the unification of three labels. In those cases, the processing in the phase II is facilitated by writing, for only one of the two or three labels having the smallest label value, the other label(s) to be unified with the one label.

In the process 94 for transition to the next status, a0, i and j in the common parameter memory 6 and the status [b, a] managed by the status memory 3 are updated, as required A column of a0' in FIGS. 9A and 9B represents the value of a parameter a0 which is used in the next processing and can be determined by the definition of the MR system explained in conjunction with FIG. 4. More particularly, in the case of the PASS mode, the determination can be made by referring to start point and end point information on the reference line as shown in a column a0' in FIGS. 9A and 9B. In the case of the HORIZONTAL mode, x1 or x2 determined in the above-mentioned coordinate update process 92 can be used, as it is. Δi and Δj represents the increments of parameteres i and j in the processing for a unit corresponding to a code word under consideration. The value of i is increased after all processes 92–94 have been completed and the value of j is increased before x1 is updated as mentioned before. A column of [b, a]' represents the value of a status [b, a] to which transition is to be next made.

Next, a method for decision of the condition bx made by the process selection routine 2 will be explained by use of FIG. 10. The decision can be made by calculating an equation shown in a column "DETERMINANT" 103 of FIG. 10 for a code 101 and a status 102 and thereafter examining conditions such as 0, +, −, etc. shown in a column of bx in FIG. 10. For example, when the code 101 is $V_R(1)$ and the status 102 is ①, the value of the determinant R1.x2−R1 x1−1 is calculated by referring to the run table 50 by use of the index i. The condition bx is decided as being (*, 0), which means "00" or "10", when the value of the above determinant is 0 and as being (*, 1) when it is positive. The value of the above determinant never becomes negative, as apparent from the definition of the MR code. When the code is $V_L(2)$ and the status is ①, the value of the determinant R1.x1−R0.x2−2 is calculated by referring to the run table by use of the index i. The condition bx is decided as being (0, *), (1, 0) and (1, 1) when the value of the above determinant is positive, 0 and negative, respectively. A portion indicated by * in the column 104 of FIG. 10 shows that no corresponding condition exists in light of the definition of the MR code.

Figure 11A:
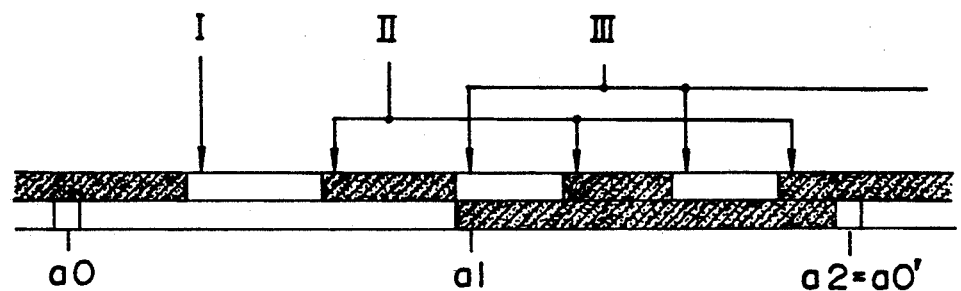
FIGS. 11A to 11C are diagrams for explaining various connection conditions of runs in a HORIZONTAL mode.
Figure 11B:
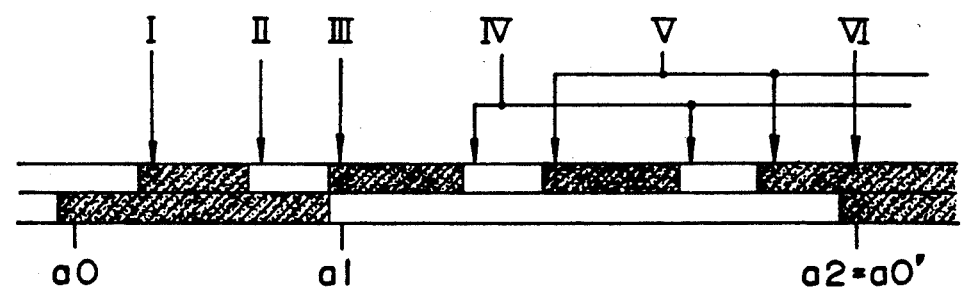
Figure 11C:
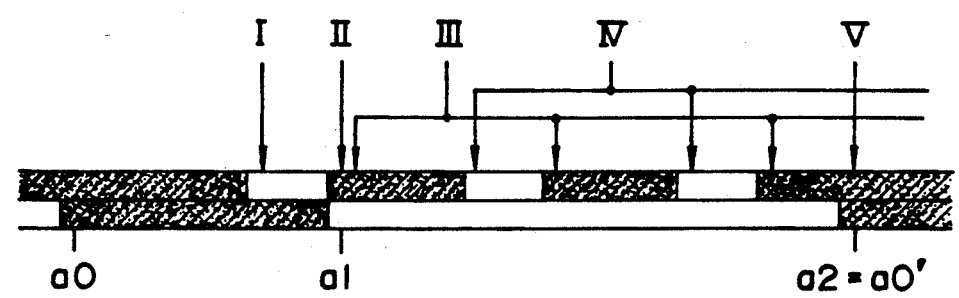

By the above-mentioned is completed the explanation of the contents of the individual update processes performed in the case where the result of the processing by the code analysis routine 1 is the PASS mode or the VERTICAL mode. Next, explanation will be made of the contents of individual update processes performed in the case where the result of the processing by the code analysis routine 1 is a HORIZONTAL mode. FIGS. 11A to 11C show the conditions of connection of runs on the reference and coding lines $L_R$ and $L_C$ for the status [b, a] in the case of the HORIZONTAL mode. FIGS. 11A, 11B and 11C correspond to the statuses ①, ② and ③, respectively. Symbols I to VI represent start and end point coordinates on the run table for respective runs on the reference line $L_R$ and reference to those coordinates is made in steps with the same reference symbols inflow charts shown in FIGS. 12 to 14 which will be explained later on. It does not necessarily follow that FIGS. 11A to 11C show all of the relationships in connection between runs which may appear in the actual image processing. Also, there may be the case where the same connection relationships as those shown exist between runs other than those shown. However, FIGS. 11A to 11C represent all combinations necessary for examing the connection relationships between runs.

Next, the contents of the individual update processes in the individual update process routines for the HORIZONTAL mode will be explained by use of FIGS. 12 to 14. In the following explanation, symbols h1 and h represent parameters of the MR code for the HORIZONTAL mode and correspond to the values of a1−a0 and (a2−a1)+(a1−a0) in FIG. 3, respectively. These values can be obtained directly as a parameter given from the code analysis routine 1 (in the case of h1) or can be calculated easily from parameters given from the code analysis routine 1 (in the case of h).

Figure 12:
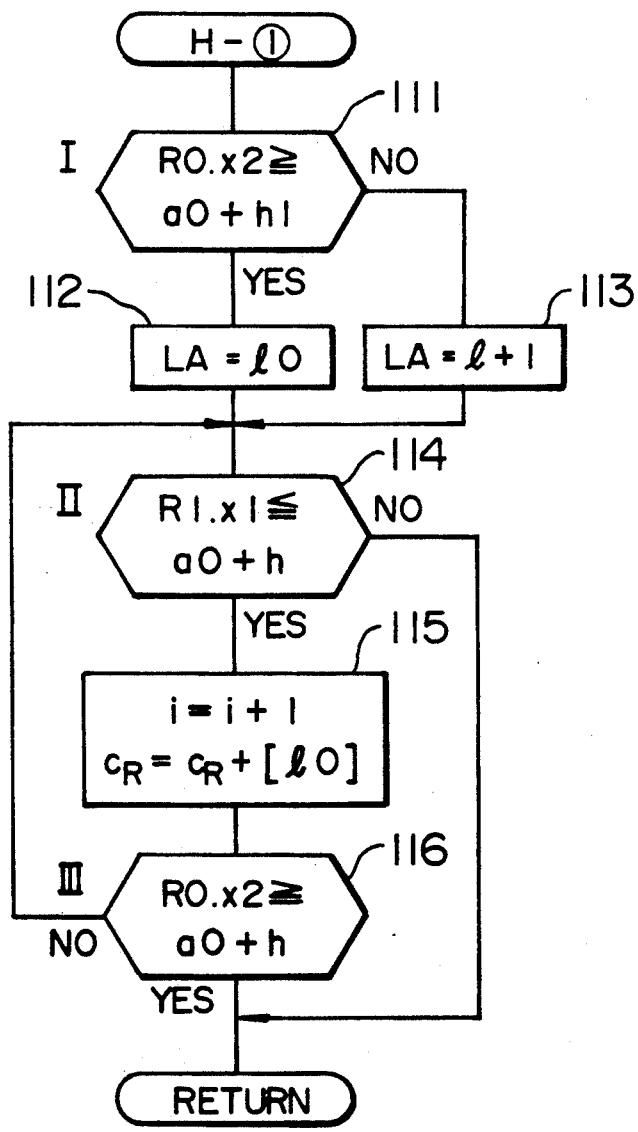
FIGS. 12 to 14 are flow charts showing the contents of processes performed by the individual update process routines in the HORIZONTAL mode.

FIG. 12 is a flow chart showing the contents of a processing when the status is ①. The index j is incremented by one. Thereafter, in Step I (step III), the examination is made of whether or not a run (the i-th run) on the reference line continuing from a unit preceding a unit under consideration is connected with a run (the j-th run) under consideration on the coding line by comparing an end point [R0.X2] of the i-th run and a lead point [a0+h1] of the j-th run, and the j-th run is labelled with LA=10 when the result of examination is affirmative (step 112) and is provided with a new label LA=1+1 when it is negative (step 113). Next, in Step II (step 114), the examination is made of whether or not any unprocessed run on the reference line exists in the unit under consideration by comparing a lead point [R1.X1] of the (i+1)-th run on the reference line and a lead point [a0+h] of a next unit on the coding line, and when an unprocessed run exists, the index i is incremented by one and the indication of unification of the label for this unprocessed run, which is defined as the new i-th run now because i has been incremented, on the reference line and the label 10 provided to the j-th run in step I is registered to $C_R$ in the connection table 70 (step 115). Further, in Step III (step 116), the examination is made of whether or not the end point x2 of the new i-th run on the reference line exists within the unit under consideration. In the case where the end point of the new i-th run exists within the unit under consideration, the process of Step II is repeated. The provision of the process of Step II and the process of Step III may look like a double-check. However, this is necessary in order to stop the present processing when such an imaginary run of zero length at the right end of each line as mentioned before is processed.

Figure 13:
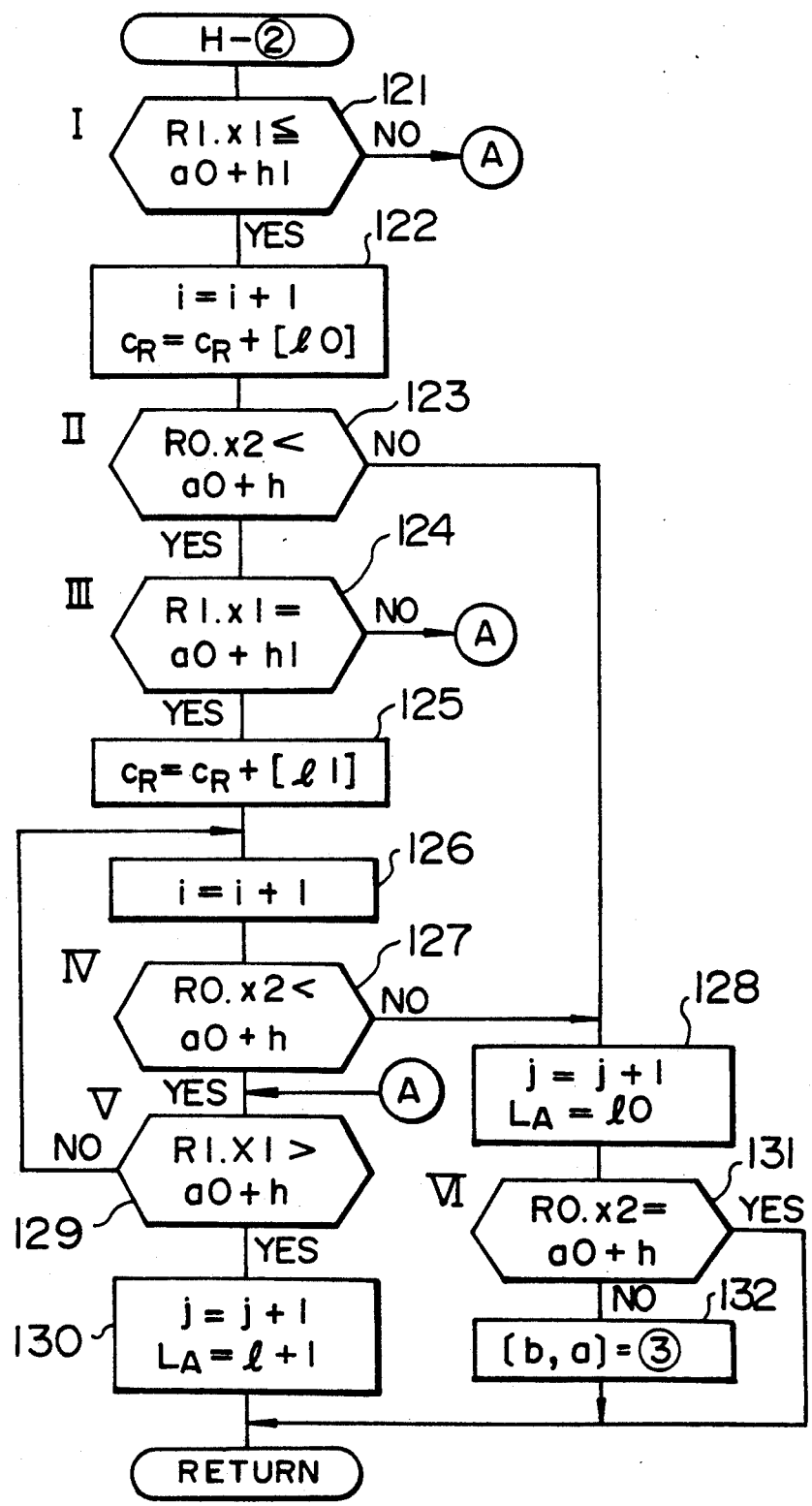

FIG. 13 is a flow chart showing the contents of a processing when the status is ②. In this case, the j-th run in a unit under consideration on the coding line has been provisionally labeled with a label 1. Firstly, in Step I (step 121), the examination is made of whether or not the (i+1)-th run (the first run in FIG. 11B) within the unit on the reference line $L_R$ is connected with the i-th run under consideration on the coding line $L_C$, and when the two runs are connected, the index i is incremented by one and the indication of unification of the label for said (i+1)-th run which is defined as the new i-th run now on the reference line and a label l given to the above new i-th run is registered to $C_R$. Next, in Step II (step 123), the examination is made of whether or not the above new i-th run on the reference line $L_R$ is connected with the next run (the (j+1)-th run) on the coding line $L_C$. In the case where those runs are not connected with each other, the flow goes to Step III (step 124). In step III, the examination is made of whether or not the next run (the (i+1)-th run) on the reference line is connected with the j-th run on the coding line, and in the case where these runs are connected with each other, the indication of unification of the label for the (i+1)-th run and the label given to the j-th run is registered to $C_R$ (step 125) and the index i is incremented by one (step 126). In Step IV (step 127), the examination is made of whether or not said (i+1)-th run, which is defined as the further new i-th on the reference line run now because i has been incremented, is connected with the (j+1)-th run on the coding line by comparing the end point [R0.X2] of the further new i-th run and the lead point [A0+h] of (j+1)-th run. In the case where those two runs are not connected, the flow go to Step V (step 129). In step V, the examination is made whether or not the further next run exists on the reference line within the unit under consideration, and in the case where such a run does not exist, the index j is incremented by one and the next run in the next unit on the coding line $L_C$ is provided with a new label (LA=1+1), thereby completing the present processing. In the case where the examination in Step II shows that the new i-th run on the reference line $L_R$ and the (j+1)-th run on the coding line $L_C$ is connected or in the case where the examination in step IV shows that the further new i-th run on the reference line and the (i+1)-th run on the coding line are connected, the index j is incremented by one and the (j+1)-th run on the coding line is provided with a label 10 (step 128). Thereafter, in Step VI (step 131), the examination is made whether or not the position of the end point [R0.X2] of the new or further new i-th run on the reference line is equal to that of the lead point [a0+h] of a further next unit following the new unit where the new j-th run exists. If the result of examination is negative, the color of a picture element on the reference line situated at the position of coordinate a0' shown in FIG. 11B is checked, and in the case where the color is black, the transition of the status [b, a] to ③ is made. The provision of the process of Step IV and the process of Step V may look like a double-check. However, this is necessary in order to stop the present processing when such an imaginary run of zero length at the right end of each line as mentioned before is processed.

Figure 14:
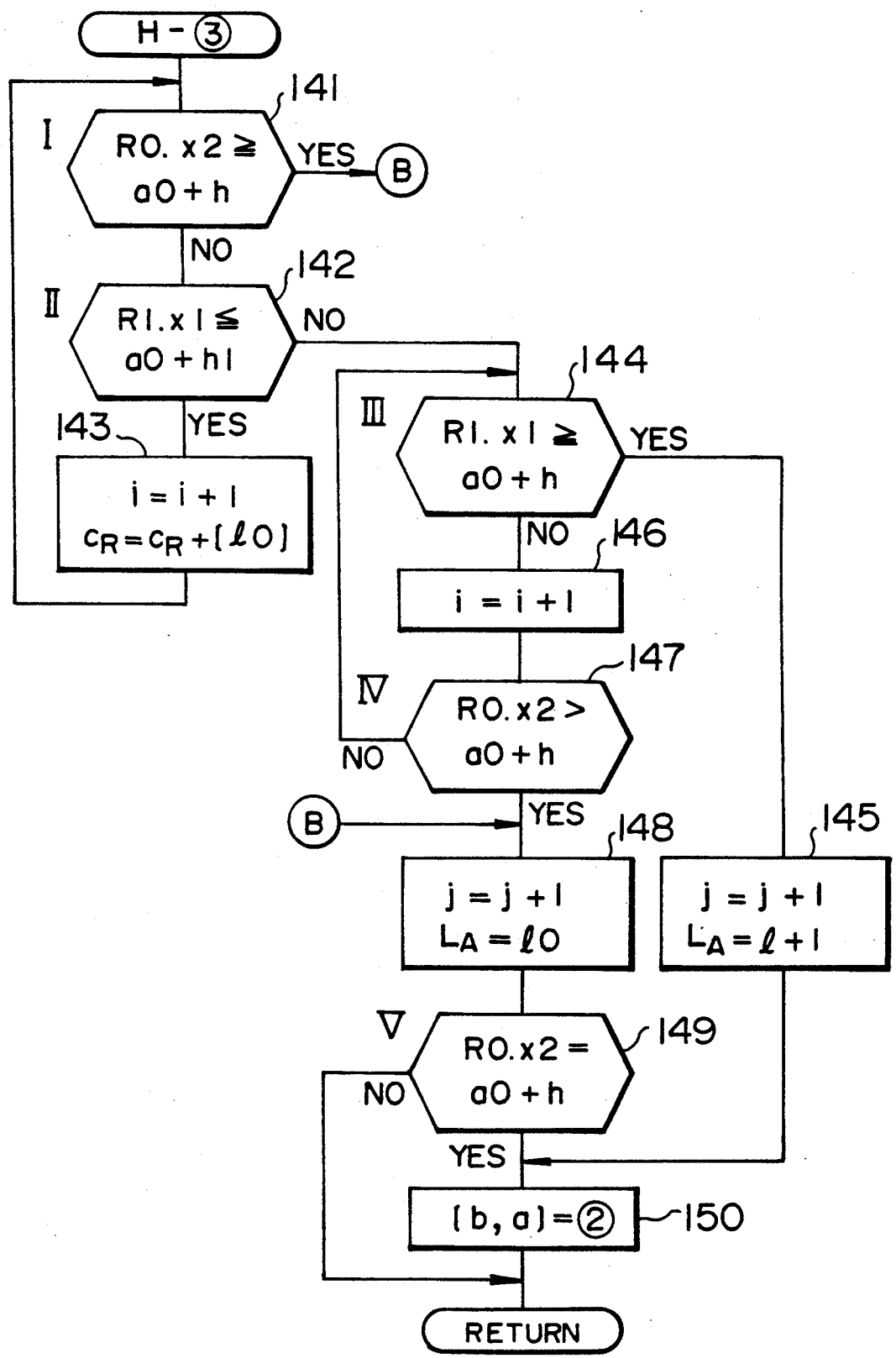

FIG. 14 is a flow chart showing the contents of processing when the status is ③. Firstly, in Step I (step 141), the examination is made of whether or not the i-th run (the first run on the reference line $L_R$ in FIG. 11C) is connected with the (j+1)-th run (the second run on the coding line $L_C$ in FIG. 11C). When those runs are not connected, the flow goes to Step II (step 142). In Step II, the examination is made of whether or not the (i+1)-th run (the second run on the reference line in FIG. 11C) is connected to the j-th run (the first run on the coding line in FIG. 11C), and when these runs are connected, the index i is incremented by one and the indication of unification of the label for said (j+1)-th run which is defined as the new i-th run now on the reference line and a label given to the j-th run is registered to $C_R$ (Step 143). Thereafter, the flow returns to Step I. In the case where the examination in Step II shows that those two runs are not connected, the flow goes to Step III (step 144). In Step III, the examination is made of whether or not any further run exists on the reference line in a unit under consideration by comparing the end point [R1.X1] of the (i+1)-th run on the reference line and the lead point [a0+h] of the next unit, and when such a run exists, the index i is incremented by one (step 146). Further, in Step IV (step 147), the examination is made of whether or not the above (i+1)-th run which is defined as i-th run now on the reference line is connected with the (j+1)-th run on the coding line, and when these runs are not connected, Step III is repeated. In the cases where the examination in Step I or Step IV shows that the i-th run and the (j+1)-th run are connected, the index j is incremented by one and said (j+1)-th run which is defined as the new j-th run now on the coding line is provided with a label 10. Thereafter, in Step V (steps 149 and 150), the color of a picture element on the reference line situated at the position of coordinate a0' shown in FIG. 11C is checked, and when the color is white, the transition of the status [b, a] to ② is made. In the case where the examination in Step III shows that no further run exists in the unit on the reference line, the index j is incremented by one and said (j+1)-th run which is defined as the new j-th run now on the coding line is provided with a new label l+1 (step 145), and step 150 is performed, thereby completing the processing. The provision of the process of Step III and the process of Step IV may look like a bouble-check. However, this is necessary in order to stop the present processing when such an imarginary run of zero length at the right end of each line as mentioned before is processed.

In the shown flow charts, the contents of update processes for the coordinate information x1 and x2 in the run table and the common parameter a0' are omitted for simplicity of representation. These processes can be determined uniquely without depending upon the condition of a run on the reference line. More particularly, the updating of the coordinate information in the run table 50' is made as follows. In the case of FIG. 12, x1 and x2 are updated for the updated index j in accordance with a0+h1 and a0+h, respectively. In the cases of FIGS. 13 and 14, x2 is updated for the index j before updating in accordance with a0+h1 and x1 is updated for the updated index j in accordance with a0+h. The common parameter a0' is updated into a0+h irrespective of the status [b, a].

Figure 15:
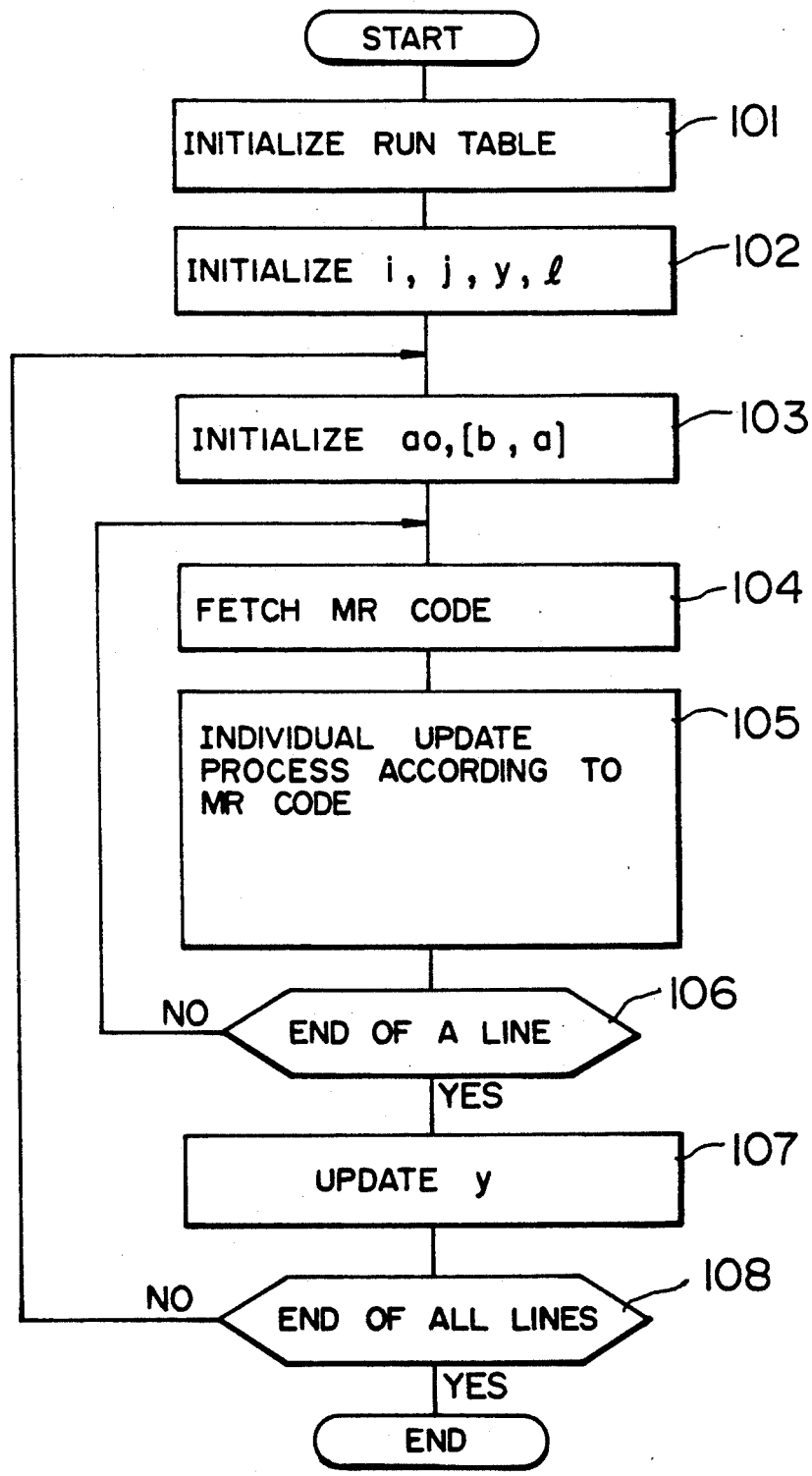
FIG. 15 is a flow chart showing the contents of a process for a starting line of an image and start and end processes for each line.

A process for a starting line of the image and start and end processes for each line will be explained as the final explanation of the phase I by use of FIG. 15. In step 101, the run table is initialized. More particularly, for the 0-th element on the run table, coordinates x1 and x2 are both set to a picture element position which is situated by one picture element rightward than a picture element positioned at the right end of the image. Also, the coordinate y is set to a line position which is situated by one line upward than a line positioned at the upper end of the image (that is, 0). Further, the label value LA is set to the label value 0 for an imarginary run. In step 102, the values of parameters i and j managed by the common parameter memory 6, the value of a parameter y for controlling the whole processing and the value of a parameter l managed by the connection table memory 7 are initialized. More particularly, assuming a run existing on the left of a picture element positioned at the left end of the image on a line to which the 1st line refers (that is, the 0-th line), the parameter i is set to an index −1 which indicates that run. An element whose index is −1 does not exist on the run table. However, since the status [b, a] at the lead of the image is ①, as will be mentioned hereinbelow, 0(zero) incremented from −1 by one and values more than that are actually utilized. Accordingly, no problem arises. The parameter j is set to an index 0 which indicates a run immediately preceding the 1st run on the 1st line. The parameter y, which is an index indicating a line of the image being processed, is set to 1. The parameter l is set to a provisional or virtual label value 1 for a run which is to be firstly labelled In step 103, a parameter a0 managed by the common parameter memory 6 and a status [b, a] managed by the status memory 3 are initialized. More particularly, the parameter a0 is set to a picture element position (x coordinate) which is situated by one picture element leftward than a picture element positioned at the leftmost end of each line. Also, the status [b, a] is always set to ①. Namely, even if a picture element positioned at the left end of a coding line is a black element, it is assumed that a white element exists on the left side of that black element. The setting of the initial status of the line to ① allows the subsequent processing to correctly operate. In step 104, a process corresponding to the code analysis routine 1 shown in FIG. 2B is performed to fetch one MR code from the lead of a part of image data which has not been processed yet. In step 105, processes corresponding to the process selection routine 2 and the individual update process routines 4-1 to 4-N shown in FIG. 2B are performed to update the run table memory 5, the common parameter memory 6, etc. in accordance with the MR code, the status [b, a], and so on, as has already been explained in detail.

Next, explanation will be made of the contents of a processing in the phase II. Firstly, for each of label values on the run table determined in the phase I, a label value is determined to which the label values in the run table are to be converted when the unification of labels is taken into consideration. This value can be determined in such a manner that a variable representative of a true label value to be next given is considered with 1 being taken as an initial value of the variable and the following processing is repeated starting from the smallest one of LA values in the connection table.

(1) A search is made for the minimum LA which is not provided with a true label value.

(2) The above-mentioned true label value is allotted to the searched-out LA, and all LA's defined as $C_Rm$ for the searched-out LA are determined.

(3) For LA of the determined LA's having no true label allotted thereto, the above-mentioned true label value is allotted. Further, all LA's defined as $C_Rm$ for the thus label-allotted LA are determined.

(4) The process of the above item (3) is repeated until LA having no true label allotted thereto becomes out. Thereafter, the above-mentioned variable representative of a true label value to be next provided is incremented by one.

(5) The processes of the items (1) to (4) are repeated until LA provided with no true label value becomes out.

Through the above processing, a corresponding relationship between the provisional label values determined in the phase I and the true label values is determined. Finally, the updating of label values is made. This processing can be performed by referring to the above corresponding relationship on the basis of the LA value for each run in the run table. During this processing, it is possible to detect an imarginary run of zero length in the form of a run of LA=0 and to remove it from the run table.

In the foregoing, the first embodiment of the present invention has been explained. In the following, other embodiments of the present invention will be mentioned.

In the first embodiment, the connection of black elements is defined in accordance with an octaconnection scheme. As has already been mentioned, the definition can be made in accordance with a quadriconnection scheme or another special connection scheme. In this case, what is necessary is only to modify the contents of concrete processings by the process selection routine 2 and the individual update process routines 4-1 to 4-N in conformity with the definition of the corresponding connection scheme. Also, in the first embodiment, the connection of black elements is considered. Reversely, an area of connected white elements may be labelled. In this case too, a labelling process similar to that in the case of black elements can be performed by merely modifying the contents of concrete processings by the process selection routine 2 and the individual update process routines 4-1 to 4-N. As to the definition of the connection of white elements, too, anocta-connection scheme, a quadri-connection scheme or another special connection scheme can be employed, like the case of black elements.

In the first embodiment, the result of labelling is provided in such a manner that coordinate information and true label values for runs are outputted for every run. As one modified method, it is possible to output a true label value for every picture element by adding a post-processing to the above-mentioned phases I and II. Also, there may be employed a method in which the run table 50' and the connection table 70 at the point of time of completion of the processing in the phase I are held so that reference to those tables is made in a recognition processing which will be performed later on. In this case, the processing in the phase II is not indispensable.

In the case where only the respective circumscribing rectangles of regions of connected picture elements are utilized as in a pattern recognition processing such as character recognition, the minimum value of x1, the maximum value of x2 and the minimum and maximum values of y are determined from among a plurality of runs having the same true label value and the determind values are outputted for every true label. Also, the run table produced in the processing of the phase II can be subjected to sort in order of values of labels so that the result of sort is outputted. This may facilitate the subsequent recognition processing.

In the first embodiment, the decision of the condition bx is made by the process selection routine 2. Alternatively, the bx decision processing may be performed by the individual update process routines 4-1 to 4-N, thereby making the reference to the run table memory 5 in the process selection routine 2 unnecessary. Also, the individual update process routines 4-1 to 4-N are described as independent processes for simplification of explanation. However, common ones among the individual update processes can be unified or described collectively. Thereby, for example, it is possible to reduce a memory capacity occupied by a program. If the status ② and the status ③ are unified into one status, a new status can be determined distinguishably and uniquely from the present status and a code word given. In this case, the change of the status can be made not by the individual update routine but by the code analysis routine 1 or the process selection routine 2. Further, in the first embodiment, the code analysis routine 1 outputs code words analyzed in units of one MR code and the subsequent process is performed in units of such code word. However, a plurality of code words may be outputted in a lump so that the subsequent process is performed in units of plural code words. For example, through the code V(0) is practically indicated by a one-bit pattern of "1", a code V(0)V(0) having a two-bit pattern of "11" can be considered newly. Thereby, a part of process routines can be communized, thereby making it possible to perform the code analysis process and the status transition process in the individual update process routine at high speed.

As apparent from the foregoing explanation, the processing in the phase I shown by the embodiment of the present invention is performed in units of one MR code, and generally, the processing performed for each code word does not depend upon the total number of codes. Strictly speaking, the processing performed for each code word depends upon the kind, number of code words included and the sequence of occurrence thereof. However, in image data of usual documents or the like, there is no substantial difference in the ratio of processes performed depending upon the code words. For example, the frequencies of the code words, statuses and conditions in the above-mentioned standard CCITT test documents are, for example, as shown in FIGS. 16A and 16B.

Also, though the first process in the phase II is performed in units of one element of the connection table produced in the phase I, the number of these elements is generally small as compared with that of MR codes and, generally, a process performed for each element does not depend upon the total number of elements. Though the second process in the phase II is performed in units of one element of the run table produced in the phase I, the number of these elements or runs is generally small as compared with that of MR codes and, generally, a process performed for each element or run does not depend upon the total number of runs. From the above, it can be said that a time required for the labelling process according to the present invention is approximately proportional to the number of code words. Since the number of MR codes generally increases at an order which is smaller than the second power of the number of picture elements along one side of an image and is larger that the first power thereof, a time required for the labelling process according to the present invention is considerably shorter than that in the conventional method in which the process is repeated in units of one picture element.

The greater part of the actual processing time required in the present invention is occupied by the process of the phase I, as apparent also from the above explanation. A time required for the analysis of one code word in the phase I is substantially equal to a time required for the read and shift of data including code words, the decision of codes and the decision of program loops. Though the process selection is made by the decision of status [b, a] and condition bx, a time required for the decision of status [b, a] is substantially equal to a time required for the decision of the value of one variable and a time required for the decision of condition bx is substantially equal to a time required for the twice reference to the run table and the arithmetic operation on the results. A time required for the updating of the run table is substantially equal to a time required for the read of the run table, the incrementation of the read value, the storage of the result into the run table, and the read and storage of a label value. A time required for the updating of the connection table is substantially equal to a time required for the fetch of a label from the run table and the storage of the read label into the connection table. A time required for the status transition process is substantially equal to a time required for substituting four variables by constants which are uniquely determined by the process or values which have already been determined by another process. In the case where one example of a program for realizing the above processes is executed, for example, with the Motorola 68020 microprocessor being operated at the clock of 20 MHz, processing times for the above-mentioned standard CCITT test document have exhibited the results which are shown as an example in FIG. 17. From the figure, it is obvious that the process according to the present invention can be performed at a high speed, as compared with that according to the conventional method.

In the present invention, reference is made to only image data coded by an MR system and there is no need to make reference to the original image. Therefore, in the case where a labelling process is performed for MR coded image data which is obtained from, for example, an optical disk file, image input device or facsimile equipment through a network, delicated line, bus or the like, the labelling process can be started at high speed as compared with the conventional method in which it is required to reproduce the original image by performing an image restoring process once. Also, since the MR coded image data has very less amount of data as compared with the original image data, the present invention makes it possible to greatly reduce the capacity of a memory necessary for storing image data which becomes the object of image processing. Further, the present invention has an effect that in the case where the original image data is restored from the coded image data, the image restoring process and the image labelling process can be performed in parallel with each other.

In the conventional method, a label value was obtained only for every picture element. According to the present invention, on the other hand, information defining a label value for every run can be obtained as the result of the labelling process, thereby making it possible to greatly reduce the capacity of a memory necessary for storage of the result of process as compared with the conventional method. This further provides an effect that a time required for a process such as recognition using the result of labelling and a time required for transmission of the result of the labelling process can be shortened.

I claim:

1. An image data processing method for giving area identification labels to individual image areas included in image data wherein each image area is composed of consecutive picture elements having a same color with each other, the method comprising:

a step of analyzing image data compressed by modified READ coding in units of one code word and updating contents of first table means for storing, for a plurality of runs each said run being composed of at least one consecutive picture element having said same color as objects of labeling, a relationship between run data indicative of a position of each run in the image data and a value of a provisional label given to that run, and contents of second table means for storing a relationship between provisional labels to be later unified so as to have a same value, the updating being made each time the image data is analyzed in units of one code word, on the basis of one of predetermined processing rules selected in accordance with a kind of code word analyzed; and a step of correcting the value of the provisional label for each run stored in said first table means on the basis of the contents of said second table means.

2. An image data processing method according to claim 1, wherein a plurality of said processing rules are prepared so that one of the processing rules can be selected corresponding to a combination of the kind of each code word analyzed and a status parameter indicative of the condition of a combination of a color of a first reference picture element which is included in a first portion on a coding line corresponding to said code word analyzed and a color of a second reference picture element which is on a reference line preceding said coding line and is positioned adjacent to said first reference picture element, each of said processing rules including a rule concerning the updating of the contents of said first table means, a rule concerning the updating of the contents of said second table means and a rule concerning the updating of said status parameter, and wherein each time the image data is analyzed in units of one code word, the updating of the contents of said first table means and the contents of said second table means and the updating of said status parameter are made in accordance with one of said processing rules selected corresponding to the combination of the kind of code word newly analyzed and the condition of said status parameter which was updated in the previous step of code word processing, said updated status parameter being used in the next code word processing for said coding line.

3. An image data processing method according to claim 2, further comprising a step of detecting, each time the image data is analyzed in units of one code word the change in the color of an image represented by two picture elements on said reference line located at the end position of said first portion, and wherein one of said processing rules is selected corresponding to the status of said color change in said reference line, the kind of said code word analyzed and said status parameter and the updating of the contents of said first table means and the contents of said second table means and the updating of said status parameter are made in accordance with the selected processing rule.

4. An image data processing method according to claim 3, wherein the change in the color of the image in said reference line is detected by checking the run data stored in said first table means in accordance with one among a plurality of determination rules selected corresponding to the kind of the code word analyzed and said status parameter.

5. An image data processing method of giving identification labels to individual areas of connected picture elements having a same color included in image data, comprising:

a step of analyzing image data represented by modified READ codes in units of one code word;

a step of determining, for each code word analyzed, at least one of position data of a run composed of at least one consecutive picture element of said color as an object of labeling, a value of provisional labels to be given to said run and a relationship between provisional labels to be later unified so as to have a same value in accordance with a predetermined processing rule defined corresponding to the kind of each code word analyzed and storing determined data into a memory; and a step of correcting the value of the provisional labels stored in said memory by referring to the data of the relationship between provisional labels stored in said memory.

6. An image data processing method according to claim 5, wherein a plurality of said processing rules are prepared so that one of those rules can be selected corresponding to a combination of the kind of code word analyzed and a status parameter indicative of a condition of a combination of a color of a first reference picture element which is included in a first portion of a coding line specified by the code word analyzed and a color of a second reference picture element which is on a reference line preceding said coding line and is positioned adjacent to said first picture element, wherein each time the image data is analyzed in units of one code word, one of said processing rules is selected corresponding to the combination of the kind of said code word newly analyzed and the value of said status parameter updated in the previous code word processing and wherein the determination of said run position data, said provisional label value and said relationship between provisional labels and the updating of the value of said status parameter are made in accordance with the selected processing rule, said updated status parameter being used in the selection of said processing rule in the next code word processing.

7. An image data processing method according to claim 6, further comprising a step of detecting, each time the image data is analyzed in units of one code word, the change in the color of two picture elements on said reference line located at a last position of said first portion, wherein said plurality of processing rules are prepared so that one of those rules can be selected corresponding to the change in the color of said two picture elements in said reference line, the kind of said code word analyzed and said status parameter, and wherein each time the image data is analyzed in units of one code word, one of said processing rules is selected and the determination of said run position data, said provisional label value and said relationship between provisional labels and the updating of the value of said status parameter are made in accordance with the selected processing rule.

8. An image data processing method according to claim 7, wherein the change of color of an image in said reference line is detected by checking the run position data stored in said memory in accordance with one among a plurality of determination rules selected corresponding to the kind of said code word analyzed and said status parameter.

9. An image data processing system for giving identification labels to image areas in image data, each of said image areas includes at least one connected run composed of consecutive picture elements of a same color, comprising:

first table means for storing a plurality of pairs of run data indicative of a position of each run in the image data and a value of a provisional label given to that run;

second table means for storing a relationship between provisional labels to be later unified so as to have a same value;

memory means for storing a plurality of processing rules;

analyzing means for analyzing image data represented by modified READ codes in units of one code word;

processing means for selecting one processing rule from among the plurality of processing rules stored in said memory means in accordance with the kind of each code word analyzed by said analyzing means, determining data inclusive of position data of a run as an object of labeling and the value of a provisional label to be given to said run in accordance with the selected processing rule, storing the determined data into said first table means, determining a relationship between provisional labels to be later unified with a same value, and storing data of said relationship between said provisional labels into said second table means; and means for correcting the value of the provisional label for each run stored in said first table means by referring to the data of the relationship between provisional labels stored in said second table means.

10. An image data processing system according to claim 9, further comprising means for storing a status parameter indicative of a status of a combination of a color of a first reference picture element which is included in a first portion of a coding line corresponding to a code word analyzed and a color of a second reference picture element which is on a reference line preceding said coding line and is positioned adjacent to said first reference picture element, wherein said memory means stores said plurality of processing rules so that one of those rules can be selected corresponding to a combination of said status parameter and the kind of each code word analyzed, and wherein each time the image data is analyzed in units of one code word, said processing means selects one of said processing rules corresponding to the combination of the kind of said code word analyzed and the present value of said status parameter and makes a determination of said run position data, said provisional label value and said relationship between said provisional labels and an updating of the value of said status parameter in accordance with the selected processing rule so that said updated status parameter is applied for the selection of a processing rule when a next code word belonging to said coding line is prepared.

11. An image data processing system according to claim 10, wherein said memory means stores a detection rule for detecting a change in the color of an image represented by two picture elements on said reference line adjacent to the last position of said first portion, and wherein said processing means detects the status of said color change in said reference line in accordance with the detection rule read from said memory means corresponding to the kind of said code word analyzed and said status parameter, selects one of said processing rules stored in said memory means in accordance with the detected status of said color change, the kind of said code word analyzed and said status parameter, and makes the determination of said run position data, said provisional label value and said relationship between provisional labels and the updating of the value of said status parameter in accordance with the selected processing rule.

12. An image data processing method for generating identification labels to be attached to individual image areas which make up image data, each of the image areas including at least one run comprised of consecutive picture elements of a same color, the method comprising the steps of:

analyzing code words which represents image data compressed by modified READ coding;

selecting a processing rule from among a plurality of processing rules stored in a memory means, according to a type of code word analyzed;

obtaining data indicative of a position of each run and a value of a provisional label given to that run;

storing in a run table data corresponding to a relationship between the obtained data indicative of the position of each run and the value of the provisional label given that run;

determining a relationship between provisional labels to be later unified with a same value;

storing in a label table, data of the relationship determined between the provisional labels to be later unified with the same value;

updating the run table and the label table each time the image data is analyzed while in the compressed format according to the modified READ coding; and correcting the value of the provisional labels for each run stored in said run table by referring to the data of the relationship between provisional labels stored in said label table when the processing for all code words has been completed.

13. A method according to claim 12 further including the step of:

outputting the results of the labeling process in parallel with the image data compressed by the modified READ coding.

14. A method according to claim 12 wherein processing the labeling of the image data is of a time period proportional to the number of code words.

* * * * *